United States Patent
Lee et al.

(10) Patent No.: US 12,279,159 B2
(45) Date of Patent: Apr. 15, 2025

(54) METHOD AND DEVICE FOR RETRANSMITTING SIDELINK IN NR V2X

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 405 days.

(21) Appl. No.: 17/775,254

(22) PCT Filed: Nov. 9, 2020

(86) PCT No.: PCT/KR2020/015629
§ 371 (c)(1),
(2) Date: May 6, 2022

(87) PCT Pub. No.: WO2021/091344
PCT Pub. Date: May 14, 2021

(65) Prior Publication Data
US 2022/0377621 A1    Nov. 24, 2022

Related U.S. Application Data

(60) Provisional application No. 62/933,350, filed on Nov. 8, 2019.

(51) Int. Cl.
*H04W 4/40* (2018.01)
*H04L 1/08* (2006.01)
(Continued)

(52) U.S. Cl.
CPC ............... *H04W 28/26* (2013.01); *H04L 1/08* (2013.01); *H04W 4/40* (2018.02)

(58) Field of Classification Search
None
See application file for complete search history.

(56) References Cited

U.S. PATENT DOCUMENTS

2016/0219620 A1    7/2016    Lee et al.
2018/0359659 A1*  12/2018    Cai ..................... H04W 72/542
(Continued)

FOREIGN PATENT DOCUMENTS

EP          3987863         4/2022
WO       2021002713         1/2021

OTHER PUBLICATIONS

Huawei, HiSilicon, "Sidelink resource allocation mode 2 for NR V2X," 3GPP TSG-RAN WG1 #98bis, R1-1910056, Oct. 2019, 14 pages.
(Continued)

*Primary Examiner* — Duc T Duong
(74) *Attorney, Agent, or Firm* — LEE, HONG, DEGERMAN, KANG & WAIMEY

(57) ABSTRACT

Proposed is a method for a first device to perform wireless communication. The method may comprise the steps of: receiving information related to a configured grant (CG) resource, the information including period information about the CG resource; transmitting a first transport block via a resource in a first period on the basis of the period information about the CG resource; and transmitting a second transport block via a resource in a second period on the basis of the period information about the CG resource. For example, the resource in the second period may not be selected as a resource for retransmitting the first transport block.

20 Claims, 23 Drawing Sheets

(51) Int. Cl.
*H04W 28/26* (2009.01)
*H04W 72/0446* (2023.01)
*H04W 72/40* (2023.01)

(56) References Cited

U.S. PATENT DOCUMENTS

| | | | | |
|---|---|---|---|---|
| 2019/0132818 | A1* | 5/2019 | Yasukawa | H04W 72/02 |
| 2019/0208504 | A1* | 7/2019 | Yasukawa | H04W 24/10 |
| 2019/0313405 | A1* | 10/2019 | Li | H04W 72/542 |
| 2019/0327732 | A1* | 10/2019 | Yoon | H04W 72/0446 |
| 2020/0229171 | A1* | 7/2020 | Khoryaev | H04W 4/40 |
| 2020/0374861 | A1* | 11/2020 | Shilov | H04W 4/46 |
| 2021/0105104 | A1* | 4/2021 | Cao | H04L 1/1819 |
| 2021/0212026 | A1* | 7/2021 | Peng | H04W 28/0268 |
| 2021/0314929 | A1* | 10/2021 | Li | H04W 28/0268 |
| 2021/0329596 | A1* | 10/2021 | Freda | H04W 72/542 |
| 2021/0400650 | A1* | 12/2021 | Shilov | H04L 5/0094 |
| 2022/0007339 | A1* | 1/2022 | Li | H04W 4/40 |
| 2022/0116995 | A1* | 4/2022 | Lu | H04W 72/04 |
| 2022/0232528 | A1* | 7/2022 | Sartori | H04W 72/20 |
| 2022/0303952 | A1* | 9/2022 | Hoang | H04L 5/0005 |
| 2024/0057137 | A1* | 2/2024 | Ye | H04W 72/541 |

OTHER PUBLICATIONS

National Taiwan University, "Discussion on NR Sidelink Resource Allocation for Mode 2," 3GPP TSG-RAN WG1 #99, R1-1912502, Nov. 2019, 7 pages.
Qualcomm Incorporated, "Sidelink Resource Allocation Mechanism for NR V2X," 3GPP TSG-RAN WG1 #98bis, R1-1911106, Oct. 2019, 12 pages.
MediaTek Inc., "On Sidelink Mode-2 resource allocation," 3GPP TSG-RAN WG1 #98bis, R1-1911067, Oct. 2019, 13 pages.
PCT International Application No. PCT/KR2020/015629, International Search Report dated Feb. 22, 2021, 5 pages.
European Patent Office Application Serial No. 20886140.1, Search Report dated Jan. 18, 2024, 12 pages.
Intel Corporation, "Summary#3 for AI 7.2.4.2.2 Mode-2 Resource Allocation," 3GPP TSG RAN WG1 Meeting #98bis, R1-1911608, Oct. 2019, 37 pages.

* cited by examiner

FIG. 4
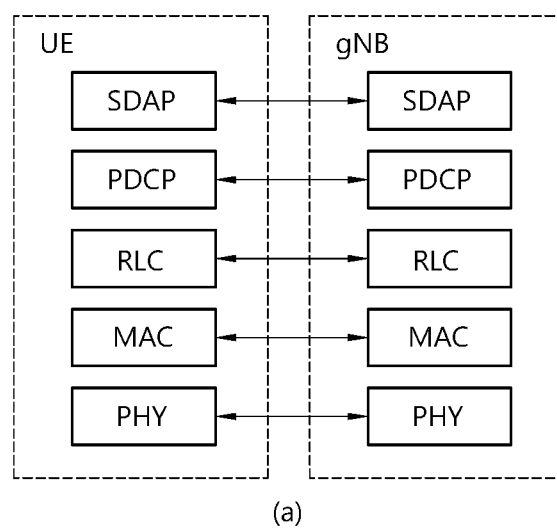
(a)
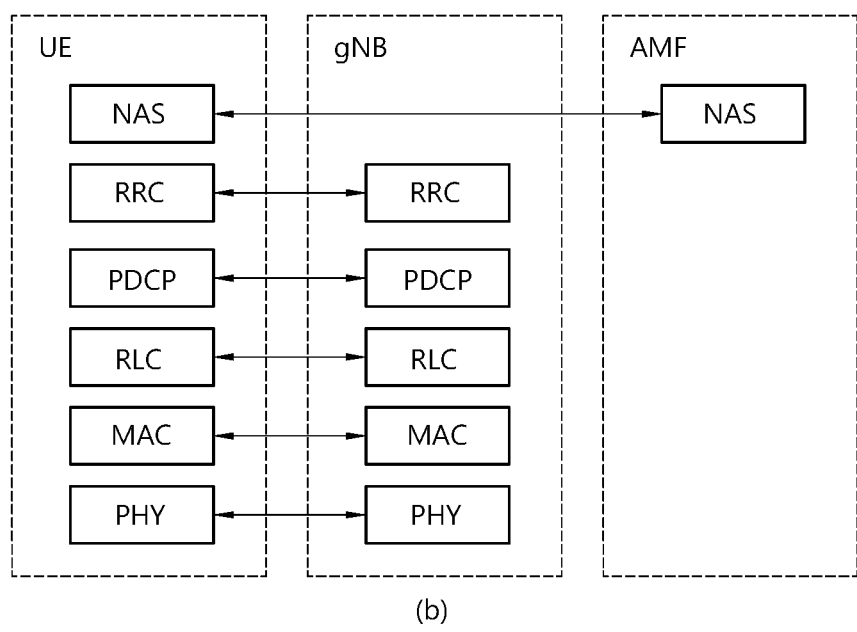
(b)

FIG. 8
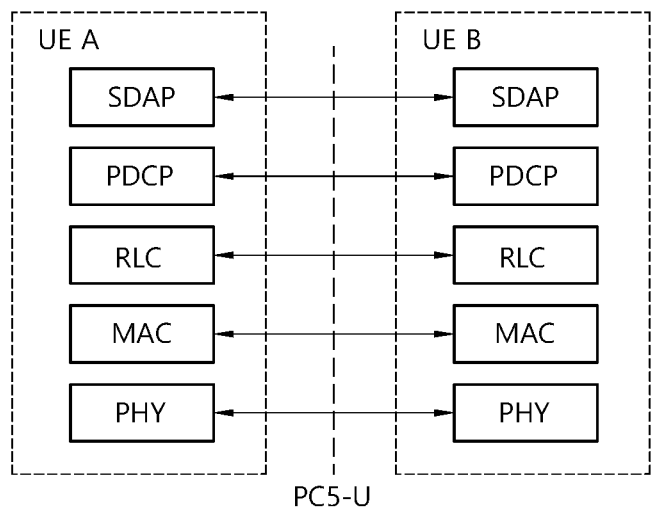
(a)
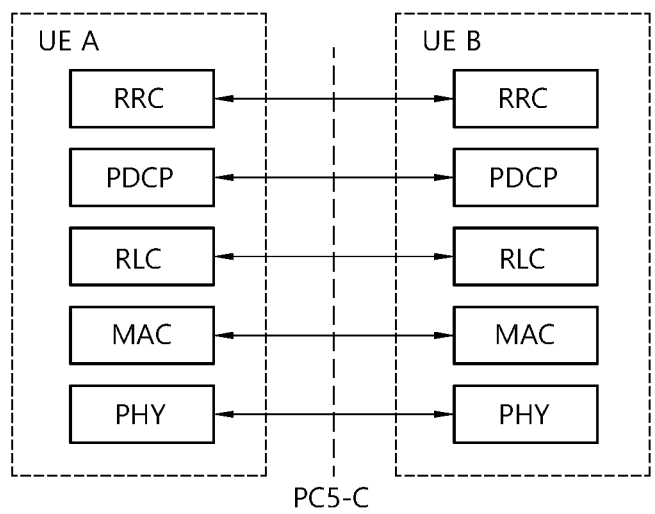
(b)

FIG. 12
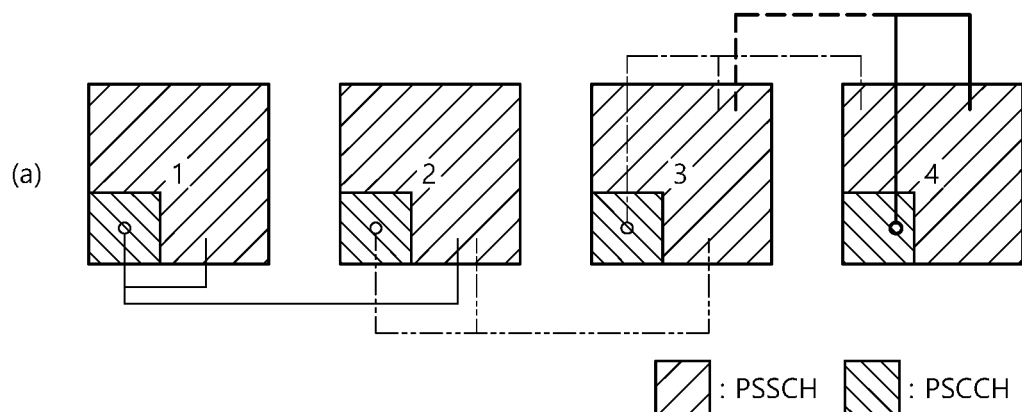
(a)
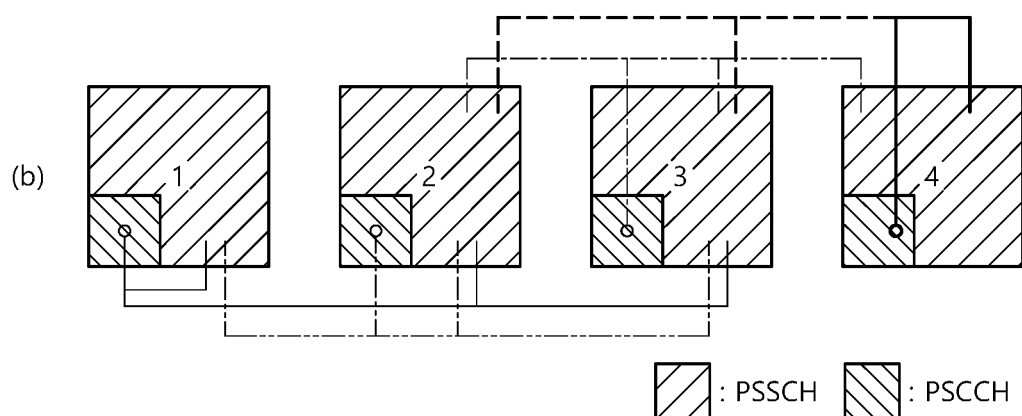
(b)
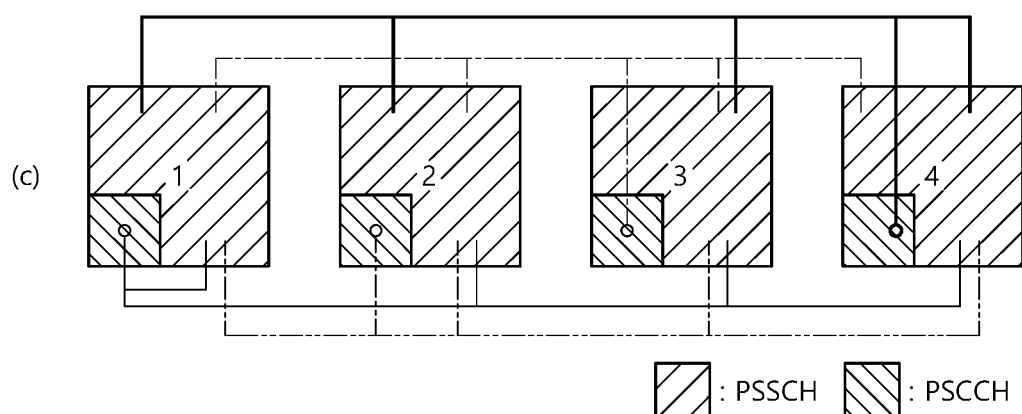
(c)

METHOD AND DEVICE FOR RETRANSMITTING SIDELINK IN NR V2X

CROSS-REFERENCE TO RELATED APPLICATIONS

This application is the National Stage filing under 35 U.S.C. 371 of International Application No. PCT/KR2020/015629, filed on Nov. 9, 2020, which claims the benefit of U.S. Provisional Application No. 62/933,350, filed on Nov. 8, 2019, the contents of which are all incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in NR V2X communication or NR sidelink communication, a transmitting UE may reserve/select one or more transmission resources for sidelink transmission (e.g., initial transmission and/or retransmission), and the transmitting UE may inform a receiving UE of information on the location of the one or more transmission resources.

In addition, meanwhile, in NR V2X communication or NR sidelink communication, if the UE transmits different transport blocks with different periods, there may be a problem in which period of resource the UE uses to transmit the transport block if transmission of one transport block fails.

For example, if the transmitting UE performs mode 2 periodic resource reservation, there may be a problem whether retransmission related to an initially transmitted or retransmitted transport block (e.g., MAC PDU) through a resource on a specific period can be performed through a resource on another period.

Technical Solutions

In an embodiment, a method for a first device to perform wireless communication is proposed. The method may comprise: receiving information related to a configured grant (CG) resource, wherein the information related to the CG resource including period information on the CG resource; transmitting a first transport block through a resource within a first period based on the period information on the CG resource; and transmitting a second transport block through a resource within a second period based on the period information on the CG resource. For example, a resource within the second period may not be selected as a resource for retransmitting the first transport block.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

FIG. 12 shows a method in which a UE that has reserved transmission resource(s) informs another UE of the transmission resource(s), based on an embodiment of the present disclosure.

DESCRIPTION OF EXEMPLARY EMBODIMENTS

Figure 1:
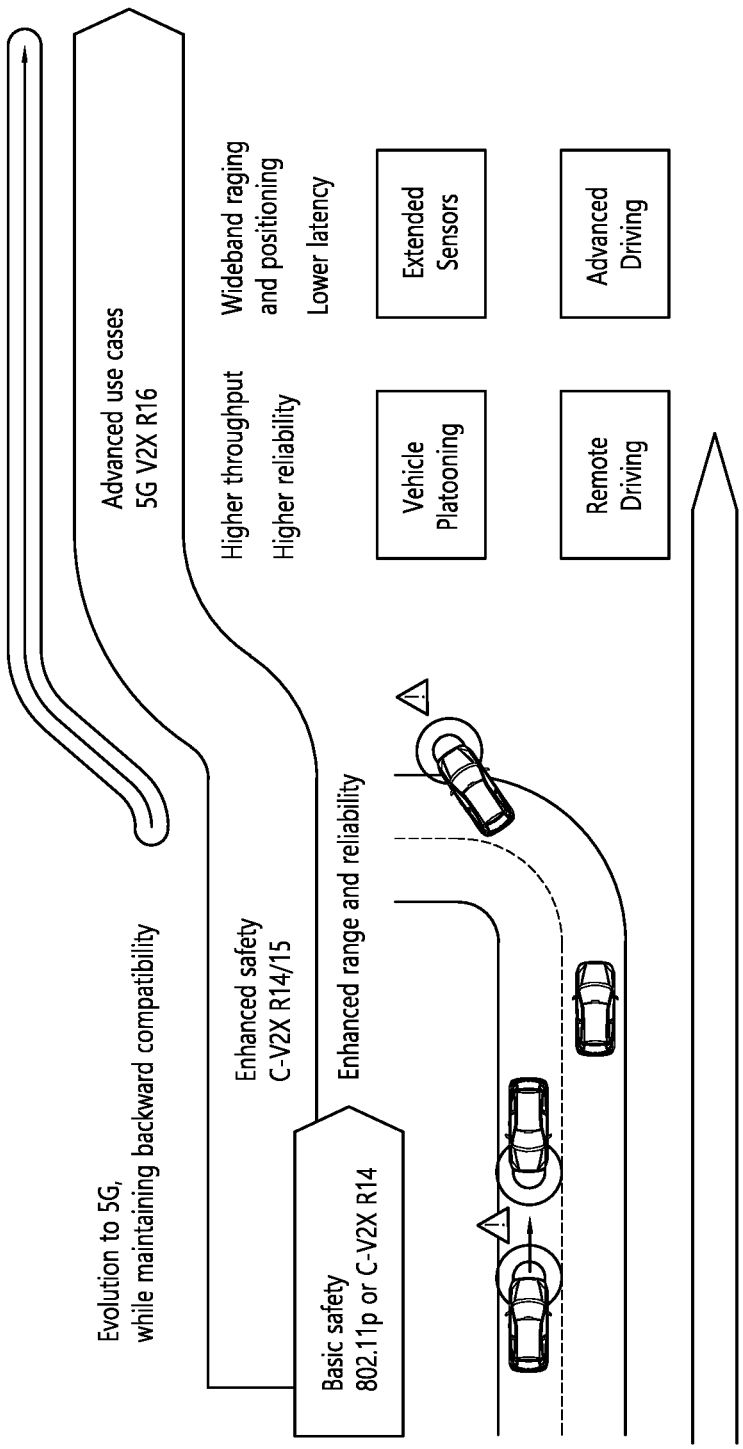
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
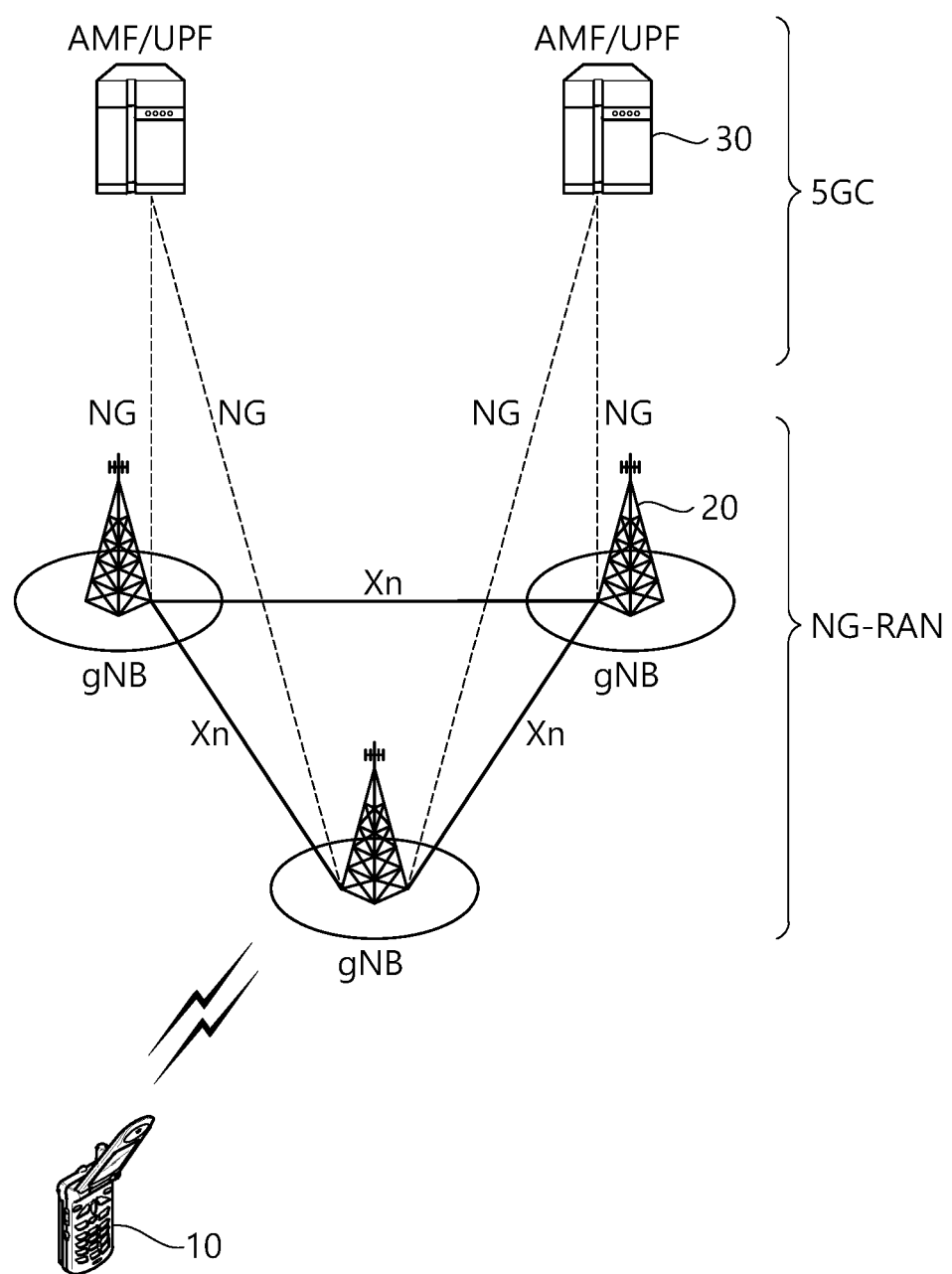
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation—radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
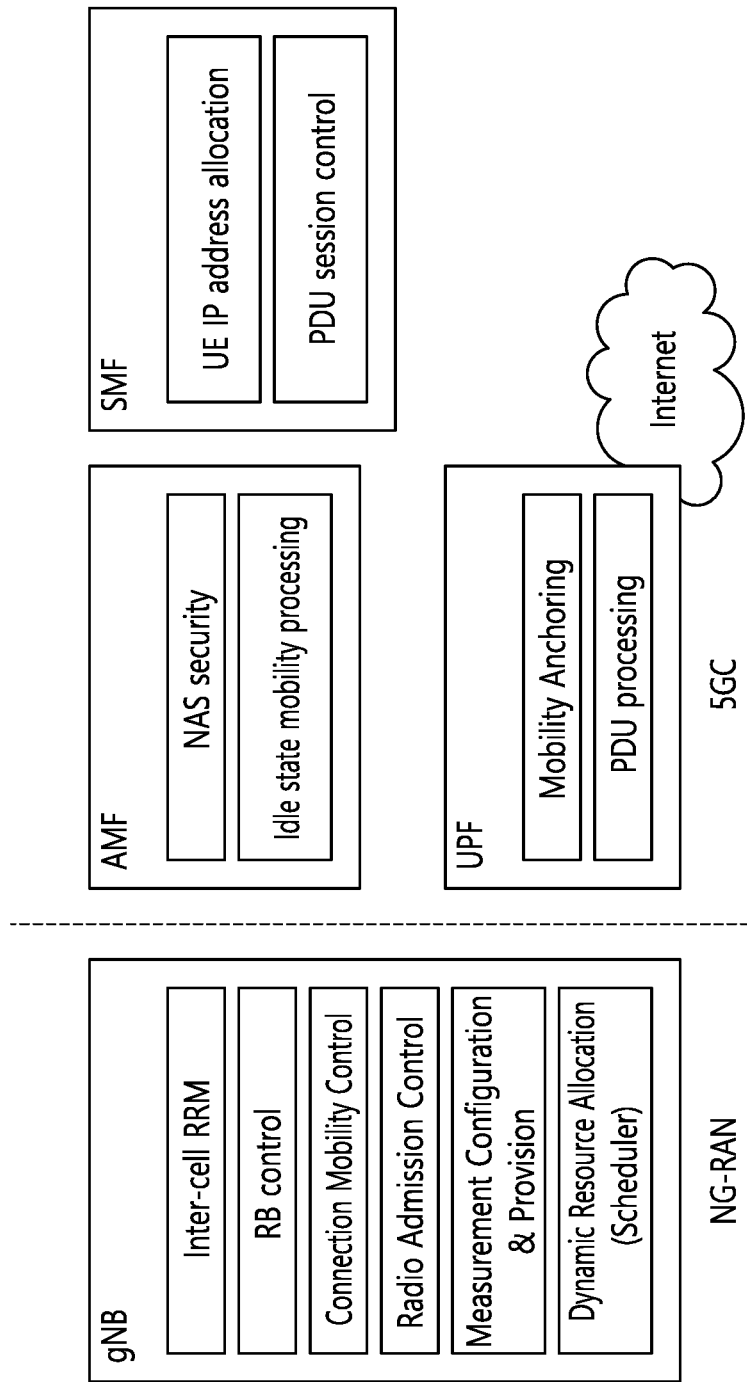
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on. [56] Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
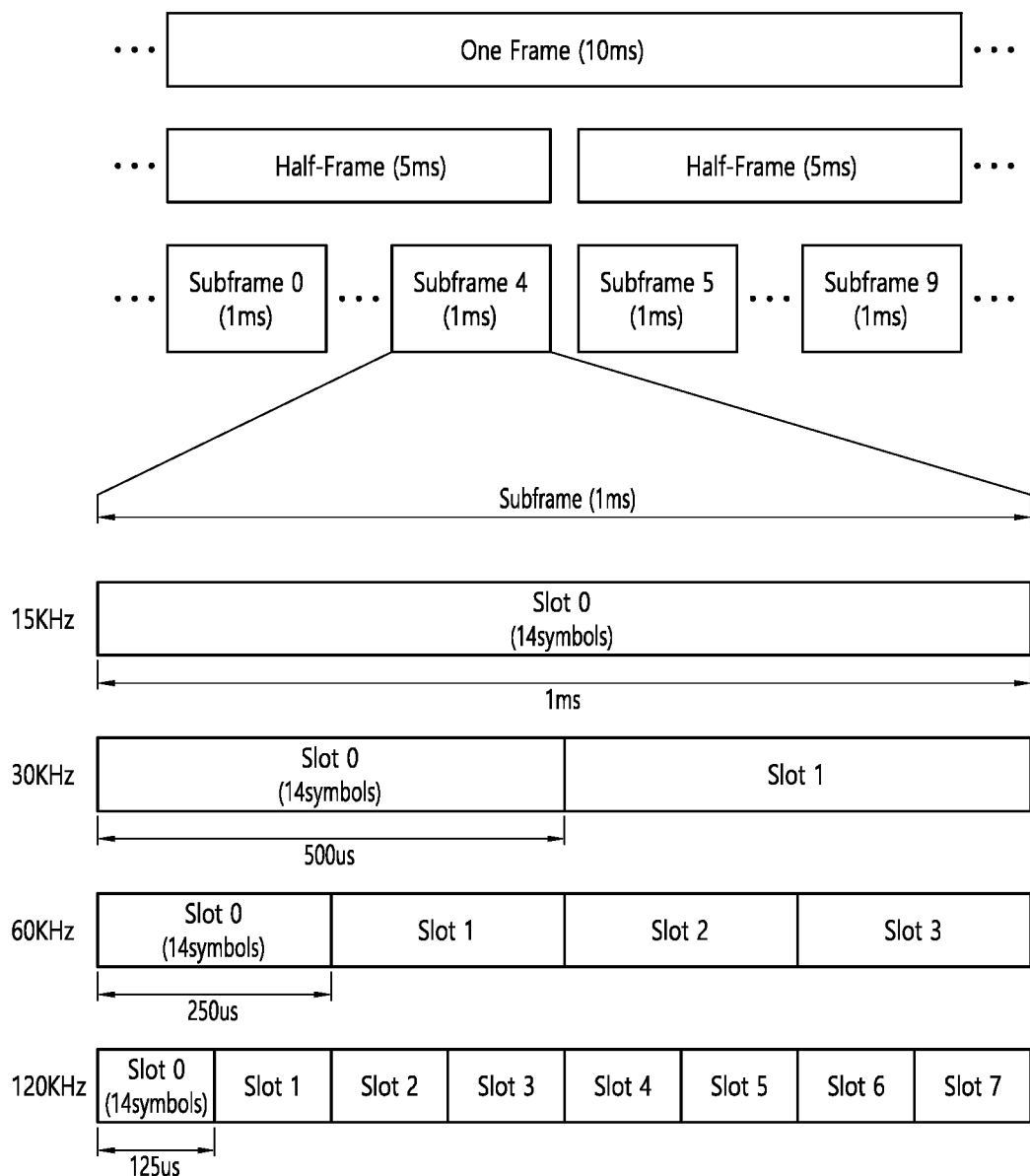
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz–6000 MHz | 15, 30, 60 kHz |
| FR2 | 24250 MHz–52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
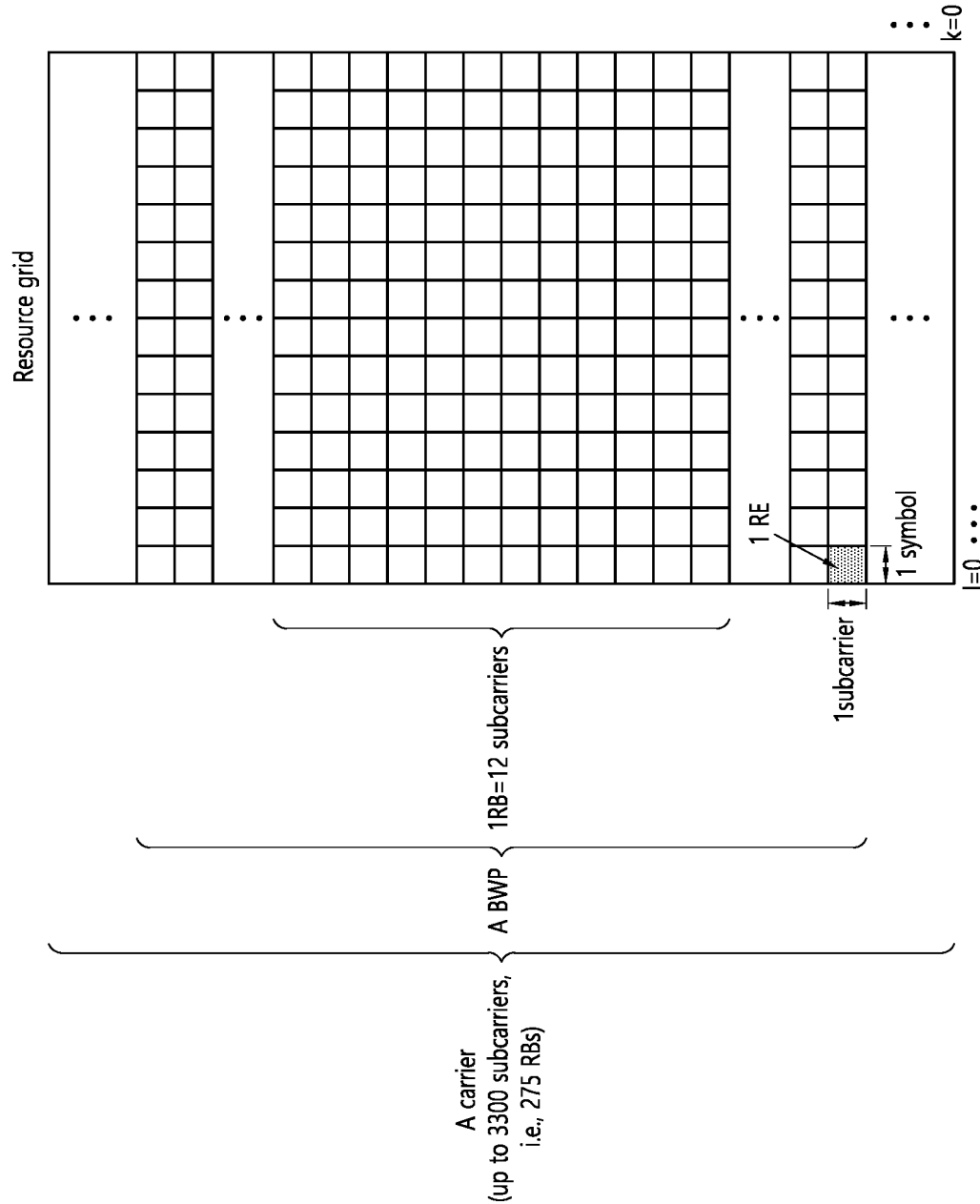
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
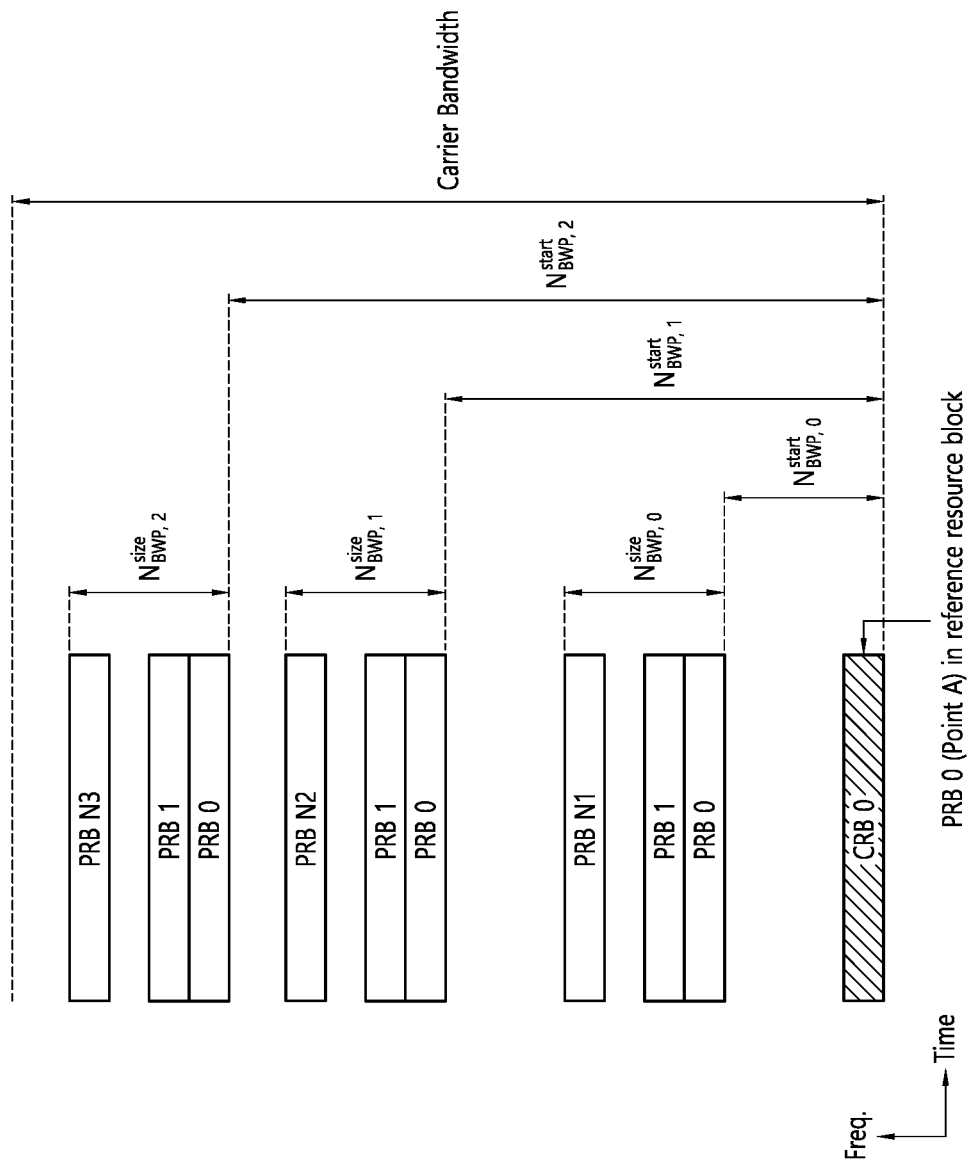
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
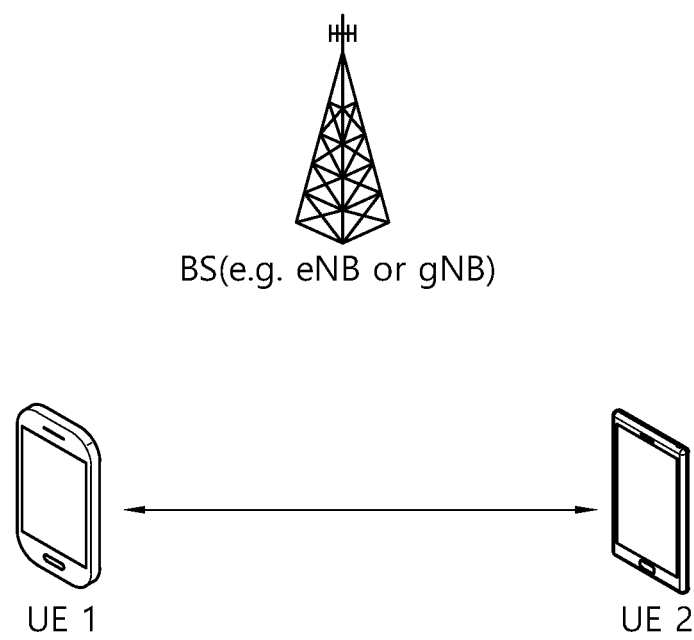
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
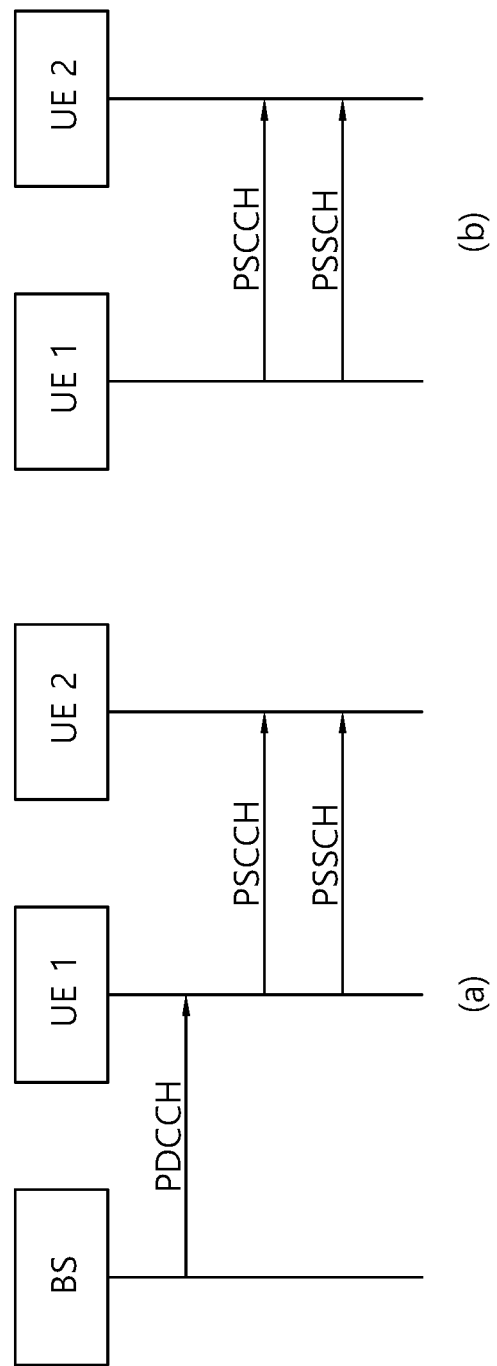
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
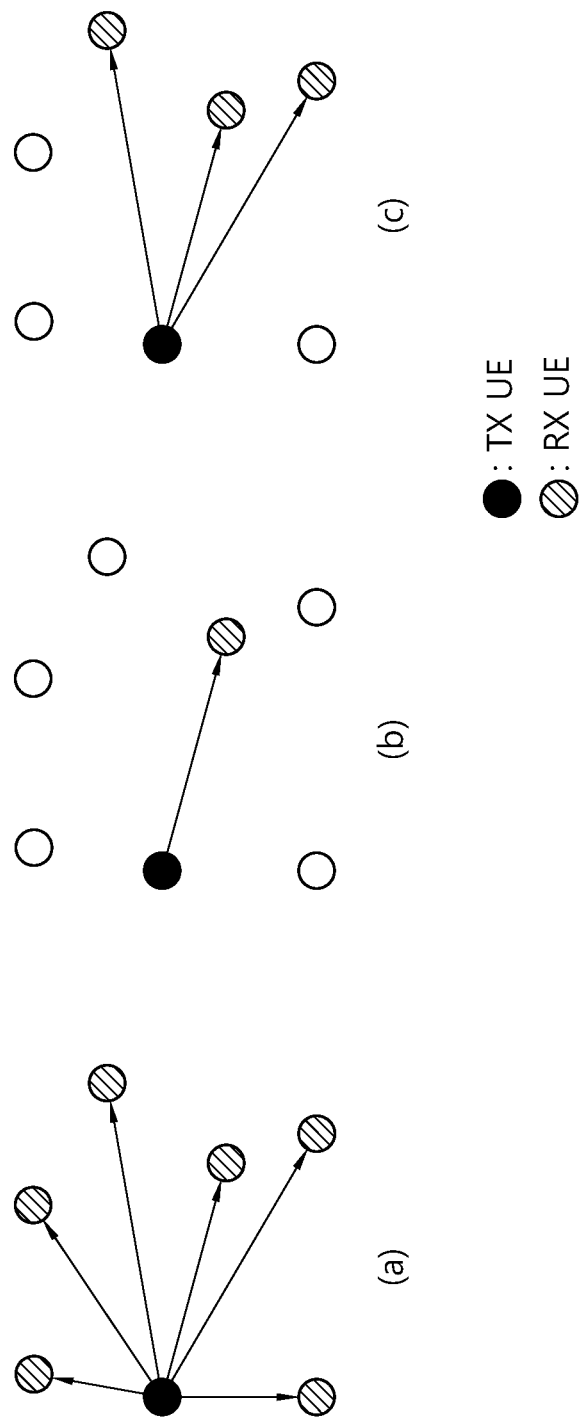
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. Additionally/alternatively, for example, the TX UE may be a UE which transmits SL CSI-RS(s) and/or a SL CSI report request indicator to the (target) RX UE. Additionally/alternatively, for example, the TX UE may be a UE which transmits a (control) channel (e.g., PSCCH, PSSCH, etc.) and/or reference signal(s) on the (control) channel (e.g., DM-RS, CSI-RS, etc.), to be used for a SL radio link monitoring (RLM) operation and/or a SL radio link failure (RLF) operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. Additionally/alternatively, for example, the RX UE may be a UE which performs SL CSI transmission to the TX UE based on SL CSI-RS(s) and/or a SL CSI report request indicator received from the TX UE. Additionally/alternatively, for example, the RX UE is a UE which transmits a SL (L1) reference signal received power (RSRP) measurement value, to the TX UE, measured based on (pre-defined) reference signal(s) and/or a SL (L1) RSRP report request indicator received from the TX UE. Additionally/alternatively, for example, the RX UE may be a UE which transmits data of the RX UE to the TX UE. Additionally/alternatively, for example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, in case the RX UE transmits SL HARQ feedback information for a PSSCH and/or a PSCCH received from the TX UE, the following options or some of the following options may be considered. Herein, for example, the following options or some of the following options may be limitedly applied only if the RX UE successfully decodes/detects a PSCCH scheduling a PSSCH.

(1) groupcast option 1: no acknowledgement (NACK) information may be transmitted to the TX UE only if the RX UE fails to decode/receive the PSSCH received from the TX UE.

(2) groupcast option 2: If the RX UE succeeds in decoding/receiving the PSSCH received from the TX UE, ACK information may be transmitted to the TX UE, and if the RX UE fails to decode/receive the PSSCH, NACK information may be transmitted to the TX UE.

Meanwhile, in the present disclosure, for example, the TX UE may transmit the following information or some of the following information to the RX UE through SCI(s). Herein, for example, the TX UE may transmit some or all of the following information to the RX UE through a first SCI and/or a second SCI.

- PSSCH (and/or PSCCH) related resource allocation information (e.g., the location/number of time/frequency resources, resource reservation information (e.g., period))
- SL CSI report request indicator or SL (L1) reference signal received power (RSRP) (and/or SL (L1) reference signal received quality (RSRQ) and/or SL (L1) reference signal strength indicator (RSSI)) report request indicator
- SL CSI transmission indicator (or SL (L1) RSRP (and/or SL (L1) RSRQ and/or SL (L1) RSSI) information transmission indicator) (on a PSSCH)
- Modulation and Coding Scheme (MCS) information
- TX power information
- L1 destination ID information and/or L1 source ID information
- SL HARQ process ID information
- New Data Indicator (NDI) information
- Redundancy Version (RV) information
- (Transmission traffic/packet related) QoS information (e.g., priority information)
- SL CSI-RS transmission indicator or information on the number of antenna ports for (transmitting) SL CSI-RS
- TX UE location information or location (or distance range) information of the target RX UE (for which SL HARQ feedback is requested)
- Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, information on the number of antenna ports, etc.

Meanwhile, in the present disclosure, for example, since the TX UE may transmit a SCI, a first SCI and/or a second SCI to the RX UE through a PSCCH, the PSCCH may be replaced/substituted with the SCI and/or the first SCI and/or the second SCI. Additionally/alternatively, the SCI may be replaced/substituted with the PSCCH and/or the first SCI and/or the second SCI. Additionally/alternatively, for example, since the TX UE may transmit a second SCI to the RX UE through a PSSCH, the PSSCH may be replaced/substituted with the second SCI.

Meanwhile, in the present disclosure, for example, if SCI configuration fields are divided into two groups in consideration of a (relatively) high SCI payload size, the first SCI including a first SCI configuration field group may be referred to as a $1^{st}$ SCI, and the second SCI including a second SCI configuration field group may be referred to as a $2^{nd}$ SCI. Also, for example, the $1^{st}$ SCI may be transmitted to the receiving UE through a PSCCH. Also, for example, the $2^{nd}$ SCI may be transmitted to the receiving UE through a (independent) PSCCH or may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool).

Meanwhile, in the present disclosure, for example, since an RLF may be determined based on out-of-synch (OOS)

indicator(s) or in-synch (IS) indicator(s), the RLF may be replaced/substituted with out-of-synch (OOS) indicator(s) or in-synch (IS) indicator(s).

Meanwhile, in the present disclosure, for example, an RB may be replaced/substituted with a subcarrier. Also, in the present disclosure, for example, a packet or a traffic may be replaced/substituted with a TB or a MAC PDU based on a transmission layer.

Meanwhile, in the present disclosure, a CBG may be replaced/substituted with a TB.

Meanwhile, in the present disclosure, for example, a source ID may be replaced/substituted with a destination ID.

Meanwhile, in the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or the pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. In addition, for example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), QoS profile, QoS parameter and/or requirement, or vice versa.

Meanwhile, in various embodiments of the present disclosure, the reservation resource and/or the selection resource may be replaced/substituted with a sidelink grant (SL GRANT).

Meanwhile, in various embodiments of the present disclosure, latency may be replaced/substituted with a packet delay budget (PDB).

Meanwhile, in various embodiments of the present disclosure, a message for triggering a report on sidelink channel state information/sidelink channel quality information (hereinafter, SL_CSI information) may be replaced/substituted with a sidelink channel state information reference signal (CSI-RS) reception.

Meanwhile, in the present disclosure, blind retransmission may refer that the TX UE performs retransmission without receiving SL HARQ feedback information from the RX UE. For example, SL HARQ feedback-based retransmission may refer that the TX UE determines whether to perform retransmission based on SL HARQ feedback information received from the RX UE. For example, if the TX UE receives NACK and/or DTX information from the RX UE, the TX UE may perform retransmission to the RX UE.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

FIG. 12 shows a method in which a UE that has reserved transmission resource(s) informs another UE of the transmission resource(s), based on an embodiment of the present disclosure. The embodiment of FIG. 12 may be combined with various embodiments of the present disclosure.

Specifically, for example, (a) of FIG. 12 shows a method for performing by a transmitting UE chain-based resource reservation by transmitting/signaling location information of (maximum) 2 transmission resources to receiving UE(s) through one SCI, in the case of a value of K=4. For example, (b) of FIG. 12 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 12, the transmitting UE may transmit/signal only location information of the fourth transmission-related resource to the receiving UE(s) through the fourth (or last) transmission-related PSCCH. For example, referring to (a) of FIG. 12, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 12, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 12, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 12, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 12 shows a method for performing by the transmitting UE block-based resource reservation, by signaling location information of 4 transmission resources to receiving UE(s) through one SCI, in the case of a value of K=4.

Meanwhile, for example, in order to reduce the probability that resources for initial transmission and/or retransmission of the transmitting UE and resources for initial transmission and/or retransmission of other transmitting UEs collide/overlap partially or entirely, based on the method described in Table 5, the UE may perform resource reservation.

TABLE 5

Support at least an initial transmission and reservation of the resource(s) for retransmission(s) to have the same number of sub-channels
To down-select in the early week of RAN1#99 one of the following:
  Alt. 1-1: Support a single sub-channel PSCCH + PSSCH reserving resource(s) for retransmission(s) of a TB with a larger number of sub-channels, where PSSCH REs are occupied by 2nd stage SCI and by SCH
    1 bit indication is carried in 1st stage SCI to distinguish the single sub-channel
    TBS is determined based on number of sub-channels indicated for reserved resource(s)
    RV is determined based on explicit field in 2nd stage SCI (as agreed)
  Alt. 1-2: Support a single sub-channel PSCCH + PSSCH reserving resource(s) for the initial transmission and possibly retransmission(s) of a TB with a larger number of sub-channels, where all available PSSCH REs in the single sub-channel PSCCH + PSSCH are occupied only by 2nd stage SCI
    1st stage SCI indicates that PSSCH REs are occupied by 2nd stage SCI transmission
  Alt. 2: Do not support the different number of sub-channels between initial and reservation of resource(s) for retransmission(s)
    Alt 1 is not supported in this case
  Companies are encouraged to provide more analysis and evaluations for the above 3 alternatives Referring to Table 5, a resource for the UE to perform initial transmission and a resource reserved for retransmission by the UE may have the same number of subchannels. For example, based on Alt. 1-1, the UE may reserve resource(s) for retransmission of a TB with a larger number of subchannels, by using a single subchannel reserving resource(s) (e.g., PSCCH and PSSCH). Herein, for example, PSSCH RE may be occupied by the $2^{nd}$ SCI and the SCH. For example, based on Alt. 1-2, the UE may reserve resource(s) for initial transmission and possibly retransmission(s) of a TB with a larger number of sub-channels, by using a single subchannel reserving resource(s) (e.g., PSCCH and PSSCH). Herein, for example, all available PSSCH REs in the single subchannel may be occupied only by the $2^{nd}$ SCI. For example, based on Alt 2, the UE should reserve a resource for retransmission equal to the number of subchannels of a resource for performing initial transmission.

Meanwhile, for example, before the transmitting UE which reserved/selected a resource transmits SL information by using the reserved/selected resource, the transmitting UE may perform an operation based on the method described in Table 6, in order for the transmitting UE to check/determine whether a resource reserved/selected by itself partially or entirely collides/is overlapped with a transmission resource reserved/selected by other UEs.

evaluation procedure is triggered, the sensing window may be defined as a time interval $[n-T0, n-T_{proc,0}]$. For example, T0 may be configured or pre-configured for the UE. For example, the UE may receive information related to T0 from the network/base station. For example, it may be $T0>T_{proc,0}$.

For example, the UE may select resource(s) for all intended (re)transmission within a packet delay budget (PDB). For example, the UE may perform resource reselection based on the number of intended (re)transmissions.

For example, the transmission UE may be configured to select/reserve resources for transmission of the same TB or different TBs based on some or all of the rules below. For example, the transmitting UE may select/reserve resources for transmission of the same TB or different TBs based on some or all of the rules below. Herein, for example, a period value and/or a time gap value (e.g., option 1-a and/or 1-b in Table 7) transmitted/signaled by the transmitting UE through a pre-configured field (hereinafter, TG_FD) included in a SCI may be pre-configured/limited by the base station/network. For example, the period value and/or the

TABLE 6

Resource (re-)selection procedure supports re-evaluation of Step 1 and Step 2 before transmission of SCI with reservation
   The re-evaluation of the (re-)selection procedure for a resource reservation signalled in a moment 'm' is not required to be triggered at moment > 'm − T3'(i.e. resource reselection processing time needs to be ensured)
   FFS condition to change resource(s) from previous iteration to resource(s) from current iteration
   FFS relationship of T1 and T3, if any
   FFS whether to handle it differently for blind and feedback-based retransmission resources
For a given time instance n when resource (re-)selection and re-evaluation procedure is triggered
   The resource selection window starts at time instance (n + T1), T1 ≥ 0 and ends at time instance (n + T2)
      The start of selection window T1 is up to UE implementation subject to T1 ≤ $T_{proc, 1}$
      T2 is up to UE implementation with the following details as a working assumption:
         T2 ≥ $T2_{min}$
         If $T2_{min}$ > Remaining PDB, then $T2_{min}$ is modified to be equal to Remaining PDB
         FFS other details of $T2_{min}$ including whether the minimum window duration
         $T2_{min}$ − T1 is a function of priority
      UE selection of T2 shall fulfil the latency requirement, i.e. T2 ≤ Remaining PDB
   A sensing window is defined by time interval $[n - T0, n - T_{proc, 0})$
      T0 is (pre-)configured, T0 > $T_{proc, 0}$ FFS further details
   FFS, if $T_{proc, 0}$ and $T_{proc, 1}$ are defined separately or as a sum
   FFS relation of T3, $T_{proc, 0}$, $T_{proc, 1}$
   Time instances n, T0, T1, T2, $T2_{min}$ are measured in slots, FFS $T_{proc, 0}$ and $T_{proc, 1}$
A UE is expected to select resources for all intended (re-)transmissions within the PDB, i.e. the number of intended (re-)transmissions is an input to the resource (re-)selection procedure Referring to Table 6, before the transmitting UE transmits a SCI by using the reserved/selected resource, the transmitting UE may identify candidate resources in the resource selection window, and may re-evaluate the selection of a resource for (re)transmission among the identified candidate resources. For example, in the resource (re)selection procedure, it is assumed that the transmitting UE identifies candidate resources in the resource selection window and selects a first resource for (re)transmission from among the identified candidate resources. In this case, before the transmitting UE transmits a SCI by using the first resource, the transmitting UE may re-evaluate based on the resource (re)selection procedure.

For example, for a given time instance n at which the resource (re)selection and reevaluation procedure is triggered, the resource selection window may start at time instance (n+T1) and end at time instance (n+T2). Herein, for example, it may be T1≥0. For example, for a given time instance n at which the resource (re) selection and retime gap value transmitted/signaled by the transmitting UE through the pre-configured TG_FD included in the SCI may be pre-configured/limited by the base station/network for each pool. For convenience of description, the period value and/or the time gap value transmitted/signaled by the transmitting UE through TG_FD may be referred to as TG_VAL.

For example, the transmitting UE may transmit index information related to a plurality of pre-configured TG_VALs through TG_FD. And/or, for example, TG_VAL linked for each TG_FD related status may be pre-configured. For example, the relationship between a TG_FD related status and TG_VAL may be pre-configured. For example, a specific TG_FD related status and a specific TG_VAL may be correlated.

For example, in some or all of the rules below, the window (W) value may be a PDB or a remaining PDB. And/or, for example, the W value may be a time gap that the UE can buffer. For example, the W value may be the maximum time gap that the UE can buffer for the HARQ combining operation. Herein, for example, if the timing of a specific resource is outside the range of the W value among selected/reserved resources transmitted/signaled by the transmitting UE to the receiving UE through a SCI, the transmitting UE may transmit different SL information (e.g., packet, message, or TB) by using the specific resource. For example, if the timing of a specific resource is outside the range of the W value among selected/reserved resources transmitted/signaled by the transmitting UE to the receiving UE through one SCI within the $N_{MAX}$ value, the transmitting UE may transmit different SL information (e.g., packet, message, or TB) by using the specific resource. For example, the transmitting UE may transmit first SL information by using a resource within the range of the W value, and the transmitting UE may transmit second SL information by using a resource outside the range of the W value. For example, $N_{MAX}$ may be the maximum number of resources that the transmitting UE can transmit/signal through one SCI.

TABLE 7

When reservation of a sidelink resource for an initial transmission of a TB at least by an SCI associated with a different TB is disabled, $N_{MAX}$ is 3
  SCI signaling is designed to allow to indicate 1 or 2 or 3 resources at least of the same number of sub-channels with full flexibility in time and frequency position in a window W of a resource pool
    FFS: if full flexibility is limited in some cases
  Value 2 or 3 is (pre-)configured per resource pool
  FFS size of window W
When reservation of a sidelink resource for an initial transmission of a TB at least by an SCI associated with a different TB is enabled, select in RAN1#99 from the following:
  Option 1-a. A period > W is additionally signaled in SCI and the same reservation is applied with respect to resources indicated within $N_{MAX}$ within window W at subsequent periods
    FFS number of subsequent reservation periods
    FFS $N_{MAX}$ is always same regardless if a period > W is additionally signaled or not for SCI size perspective.
  Option 1-b. A time gap > W is additionally signaled in SCI and the same reservation is applied with respect to resources indicated within $N_{MAX}$ within window W at resources indicated by the time gap
    FFS $N_{MAX}$ is always same regardless if a time gap > W is additionally signaled or not for SCI size perspective.
  Option 2. There is no additional field (NDI and HARQ ID are used at the moment of SCI reception) to distinguish reservation for another TB, and at least one of NMAX resources can be signaled beyond window W Referring to Table 7, if reservation of a SL resource for initial transmission of a TB by a SCI associated with another TB is disabled, $N_{MAX}$ may be 3. For example, if the transmitting UE is disabled to perform resource reservation for initial transmission of second SL information by using a SCI associated with first SL information, the transmitting UE may transmit information on up to three resources by using one SCI.

For example, if reservation of a SL resource for initial transmission of a TB by a SCI associated with another TB is enabled, various options may exist. For example, if the transmitting UE is enabled to perform resource reservation for initial transmission of second SL information by using a SCI associated with first SL information, various options may exist.

For example, based on option 1-a, the transmitting UE may transmit/signal 'PERIOD>W' through a SCI. For example, based on option 1-b, the transmitting UE may transmit/signal 'TIME GAP>W' through a SCI. For example, based on option 2, an additional field for distinguishing reservations for different TBs (NDI and HARQ ID are used at the time of SCI reception) may not exist in a SCI.

Based on an embodiment of the present disclosure, it is assumed that the transmitting UE can reserve/select a transmission resource (e.g., an initial transmission resource or a retransmission resource) related to second SL information through a SCI related to first SL information based on the rules or some rules (e.g., option 1-a or option 1-b). For example, it is assumed that the transmitting UE does not successfully transmit SL information by using a resource (set) within a specific period and/or time gap repetition time, and the transmitting UE retransmits the SL information by using additional (re)transmission resource(s) (hereinafter, ADD_RETX) determined through a chain and/or block-based resource reservation/selection method. For example, it is assumed that the transmitting UE receives HARQ NACK for the transmitted SL information from the receiving UE, and the transmitting UE retransmits the SL information by using ADD_RETX.

For example, under the above-mentioned assumption, the transmitting UE may not reserve/select ADD_RETX resource(s) in a subsequent period and/or time gap repetition time. Herein, for example, based on the above rule, additional retransmission related to SL information which is transmitted based on a resource in a specific period and/or time gap repetition time is not associated with a resource in the subsequent period and/or time gap repetition time. For example, based on the rule, additional retransmission related to SL information initially transmitted based on a resource set in a specific period and/or time gap repetition time is not associated with a resource set in a subsequent period and/or time gap repetition time in terms of transmission resource reservation/selection operation. Herein, for example, based on the above rule, the transmitting UE may independently configure/schedule/allocate ADD_RETX between resources in different periods and/or time gap repetition times. For example, a resource may include a resource set. And/or, for example, based on the above rule, ADD_RETX may not be shared/borrowed between resources in different periods and/or time gap repetition times. Herein, for example, if the transmitting UE is not allowed to transmit/signal information related to a reservation/selection of additional retransmission resource(s) in the subsequent period and/or time gap repetition time in a SCI related to ADD_RETX, the above rule may be applied. For example, if the maximum time gap value in a SCI related to ADD_RETX does not reach the subsequent period and/or time gap repetition time, the above rule may be applied. For example, the maximum time gap may be a pre-configured maximum time gap. Herein, for example, if the transmitting UE performs a HARQ feedback-based retransmission operation, the above rule may be applied. For example, if the transmitting UE performs a blind retransmission operation, the transmitting UE may reserve/select ADD_RETX resource(s) exceptionally in a subsequent period and/or time gap repetition time.

For example, under the above-mentioned assumption, the transmitting UE may reserve/select ADD_RETX resource(s) in a subsequent period and/or time gap repetition time.

For example, under the above-mentioned assumption, the transmitting UE may reserve/select ADD_RETX resource(s) based on the chain or block-based resource reservation/selection method. And/or, for example, the transmitting UE may reserve/select ADD_RETX resource(s) based on the option 1-a or 1-b-based resource reservation/selection method.

For example, if the above-described rule is applied, a timeline of reserved/selected resources transmitted/signaled by the transmitting UE through one SCI may be configured as follows. Herein, for example, for convenience of description, it is assumed that the transmitting UE transmits/signals information on three reserved/selected resources by using one SCI, but the proposed method of the present disclosure can be extended to other cases as well. Herein, for example, the transmitting UE may transmit/signal information on the start location/size (e.g., resource indication value (RIV)) of the frequency of the second resource and information on a time gap between the first resource and the second resource, through the first transmitted SCI. In addition, for example, the transmitting UE may transmit/signal information on a time gap between the second resource and the third resource and information on the start location of the frequency of the third resource (e.g., signaling with a field of $\log_2(X)$ bit if the total number of subchannels on the slot is X) through the first transmitted SCI. Herein, it is assumed that the sizes of the frequency resources related to the three transmission resources are the same. For example, information on the start location of the frequency of the resource may be signaled with a field of $\log_2(X)$ bit if the total number of subchannels on the slot is X.

Figure 13:
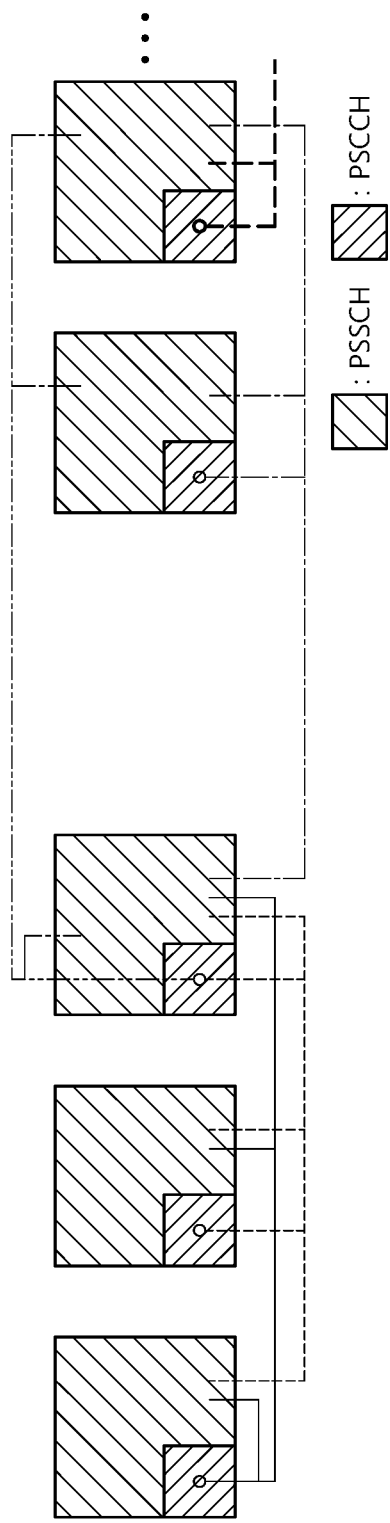
FIG. 13 shows an example of a timeline of reserved resources or selected resources transmitted by a transmitting UE through one SCI, based on an embodiment of the present disclosure.

FIG. 13 shows an example of a timeline of reserved resources or selected resources transmitted by a transmitting UE through one SCI, based on an embodiment of the present disclosure.

Referring to FIG. 13, for example, if the transmitting UE transmits an odd-numbered SCI, the transmitting UE may transmit/signal information on the next two resources including a resource at the time of the SCI transmission through the SCI. For example, if the transmitting UE transmits an even-numbered SCI, the transmitting UE may transmit/signal information on the previous/next resources including a resource at the time of the SCI transmission through the SCI.

Figure 14:
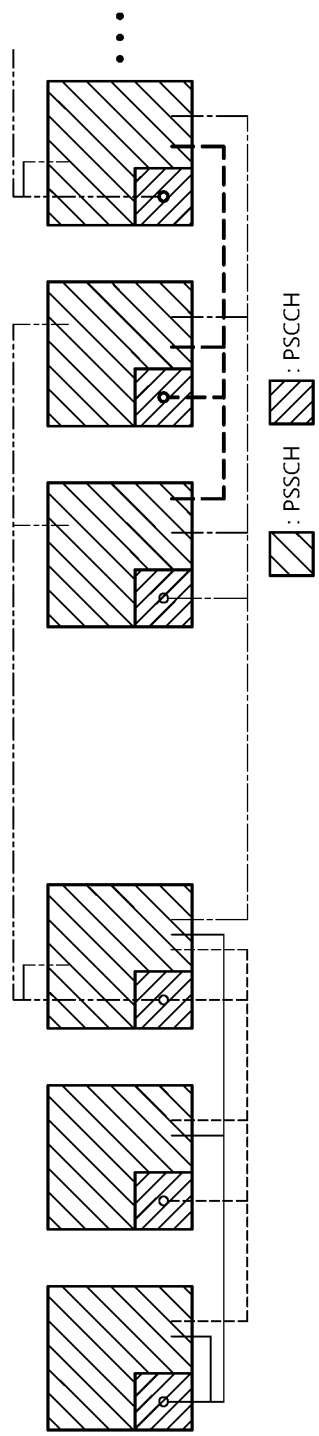
FIG. 14 shows another example of a timeline of reserved resources or selected resources transmitted by a transmitting UE through one SCI, based on an embodiment of the present disclosure.

FIG. 14 shows another example of a timeline of reserved resources or selected resources transmitted by a transmitting UE through one SCI, based on an embodiment of the present disclosure.

Referring to FIG. 14, for example, within a set of three reserved/selected resources, if the transmitting UE transmits the first SCI, the transmitting UE may transmit/signal information on the next two resources including a resource at the time of the SCI transmission through the SCI. For example, if the transmitting UE transmits the second SCI, the transmitting UE may transmit/signal information on the previous/next resources including a resource at the time of the SCI transmission through the SCI. For example, if the transmitting UE transmits the third SCI, the transmitting UE may transmit/signal information on the first and second transmissions on a set of the following three reserved/selected resources including a resource at the time of the SCI transmission through the SCI.

For example, based on whether the UE performs a chain-based resource reservation operation, the UE may determine whether to apply at least one of the rules proposed in various embodiments of the present disclosure. And/or, for example, based on whether the UE performs a block-based resource reservation operation, the UE may determine whether to apply at least one of the rules proposed in various embodiments of the present disclosure. And/or, for example, based on whether the UE performs a blind retransmission operation, the UE may determine whether to apply at least one of the rules proposed in various embodiments of the present disclosure. And/or, for example, based on whether the UE performs a SL HARQ feedback-based retransmission operation, the UE may determine whether to apply at least one of the rules proposed in various embodiments of the present disclosure. And/or, for example, based on whether the UE performs a configured grant-based resource selection/reservation operation, the UE may determine whether to apply at least one of the rules proposed in various embodiments of the present disclosure. And/or, for example, based on whether the UE performs a dynamic grant-based resource selection/reservation operation, the UE may determine whether to apply at least one of the rules proposed in various embodiments of the present disclosure.

And/or, for example, whether the UE applies at least one of the rules proposed in various embodiments of the present disclosure may be configured differently or limitedly for the UE for each resource pool. And/or, for example, whether the UE applies at least one of the rules proposed in various embodiments of the present disclosure may be configured differently or limitedly for the UE for each service type. And/or, for example, whether the UE applies at least one of the rules proposed in various embodiments of the present disclosure may be configured differently or limitedly for the UE for each service priority. And/or, for example, whether the UE applies at least one of the rules proposed in various embodiments of the present disclosure may be configured differently or limitedly for the UE for each cast type. For example, the cast type may include at least one of unicast, groupcast, and/or broadcast. And/or, for example, whether the UE applies at least one of the rules proposed in various embodiments of the present disclosure may be configured differently or limitedly for the UE for each destination UE. And/or, for example, whether the UE applies at least one of the rules proposed in various embodiments of the present disclosure may be configured differently or limitedly for the UE for each (L1 or L2) destination ID. And/or, for example, whether the UE applies at least one of the rules proposed in various embodiments of the present disclosure may be configured differently or limitedly for the UE for each (L1 or L2) source ID. And/or, for example, whether the UE applies at least one of the rules proposed in various embodiments of the present disclosure may be configured differently or limitedly for the UE for each (service) QoS parameter. For example, the (service) QoS parameter may include at least one of a reliability-related parameter, a latency-related parameter, and/or a (target) BLER-related parameter. And/or, for example, whether the UE applies at least one of the rules proposed in various embodiments of the present disclosure may be configured differently or limitedly for the UE for each (resource pool) congestion level. And/or, for example, whether the UE applies at least one of the rules proposed in various embodiments of the present disclosure may be configured differently or limitedly for the UE for each SL MODE type. For example, the SL MODE type may include SL MODE 1 and/or SL MODE 2. And/or, for example, whether the UE applies at least one of the rules proposed in various embodiments of the present disclosure may be configured differently or limitedly for the UE for each grant type. For example, the grant type may include configured grant and/or dynamic grant. And/or, for example, whether the UE applies at least one of the rules proposed in various embodiments of the present disclosure may be configured differently or limitedly for the UE for each packet/message (e.g., TB) size. And/or, for example, whether the UE applies at least one of the rules proposed in various embodiments of the present disclosure may be configured differently or limitedly for the UE for each number of subchannels used by the UE to transmit a PSSCH. And/or, for example, whether the UE applies at least one of the rules proposed in various embodiments of the present disclosure may be configured differently or limitedly for the UE for each number of RBs used by the UE to transmit a PSCCH. And/or, for example, whether the UE applies at least one of the rules proposed in various embodiments of the present disclosure may be configured differently or limitedly for the UE for each number of RBs included in (one) subchannel. And/or, for example, whether the UE applies at least one of the rules proposed in various embodiments of the present disclosure may be configured differently or limitedly for the UE for each number of subchannels included in a resource pool and/or for each number of RBs included in a resource pool. And/or, for example, whether the UE applies at least one of the rules proposed in various embodiments of the present disclosure may be configured differently or limitedly for the UE, based on whether the (one) sub-channel size and the PSCCH (frequency) resource size are the same.

For example, based on whether the UE performs a chain-based resource reservation operation, parameters may be configured differently or limitedly for the UE. And/or, for example, based on whether the UE performs a block-based resource reservation operation, parameters may be configured differently or limitedly for the UE. And/or, for example, based on whether the UE performs a blind retransmission operation, parameters may be configured differently or limitedly for the UE. And/or, for example, based on whether the UE performs a SL HARQ feedback-based retransmission operation, parameters may be configured differently or limitedly for the UE. And/or, for example, based on whether the UE performs a configured grant-based resource selection/reservation operation, parameters may be configured differently or limitedly for the UE. And/or, for example, based on whether the UE performs a dynamic grant-based resource selection/reservation operation, parameters may be configured differently or limitedly for the UE.

And/or, for example, parameters may be configured differently or limitedly for the UE for each resource pool. And/or, for example, parameters may be configured differently or limitedly for the UE for each service type. And/or, for example, parameters may be configured differently or limitedly for the UE for each service priority. And/or, for example, parameters may be configured differently or limitedly for the UE for each cast type. For example, the cast type may include at least one of unicast, groupcast, and/or broadcast. And/or, for example, parameters may be configured differently or limitedly for the UE for each destination UE. And/or, for example, parameters may be configured differently or limitedly for the UE for each (L1 or L2) destination ID. And/or, for example, parameters may be configured differently or limitedly for the UE for each (L1 or L2) source ID. And/or, for example, parameters may be configured differently or limitedly for the UE for each (service) QoS parameter. For example, the (service) QoS parameter may include at least one of a reliability-related parameter, a latency-related parameter, and/or a (target) BLER-related parameter. And/or, for example, parameters may be configured differently or limitedly for the UE for each (resource pool) congestion level. And/or, for example, parameters may be configured differently or limitedly for the UE for each SL MODE type. For example, the SL MODE type may include SL MODE 1 and/or SL MODE 2. And/or, for example, parameters may be configured differently or limitedly for the UE for each grant type, for example, the grant type may include configured grant and/or dynamic grant. And/or, for example, parameters may be configured differently or limitedly for the UE for each packet/message (e.g., TB) size. And/or, for example, parameters may be configured differently or limitedly for the UE for each number of subchannels used by the UE to transmit a PSSCH. And/or, for example, parameters may be configured differently or limitedly for the UE for each number of RBs used by the UE to transmit a PSCCH. And/or, for example, parameters may be configured differently or limitedly for the UE for each number of RBs included in (one) subchannel. And/or, for example, parameters may be configured differently or limitedly for the UE for each number of subchannels included in a resource pool and/or for each number of RBs included in a resource pool. And/or, for example, parameters may be configured differently or limitedly for the UE, based on whether the (one) sub-channel size and the PSCCH (frequency) resource size are the same.

Based on an embodiment of the present disclosure, the MAC entity may select to generate a selected sidelink grant corresponding to transmission related to a plurality of MAC PDUs. For example, the MAC entity may select sidelink data to generate a selected sidelink grant corresponding to transmission related to a plurality of MAC PDUs. For example, sidelink data may be used in a logical channel. For example, if one or more HARQ retransmissions are selected, the MAC entity may consider the first set of transmission opportunities as initial transmission opportunities and other sets of transmission opportunities as retransmission opportunities. For example, the MAC entity may consider sets of initial transmission opportunities and retransmission opportunities as a selected sidelink grant.

Based on an embodiment of the present disclosure, for each sidelink grant, if the MAC entity determines that each of the sidelink grants is used for initial transmission, a sidelink HARQ entity may associate a sidelink process with the grant. For example, the sidelink HARQ entity may obtain, for an associated sidelink process, a MAC PDU to transmit from the multiplexing and assembly entity. For example, for each sidelink grant, if the sidelink grant is a configured sidelink grant and a MAC PDU in sl-PeriodCG in which the sidelink grant is configured is not obtained, a sidelink HARQ entity may associate a sidelink process with the grant. For example, the sidelink HARQ entity may obtain, for an associated sidelink process, a MAC PDU to transmit from the multiplexing and assembly entity.

For example, in mode 2, if the transmitting UE reserves periodic resources, retransmission related to a transport block may not be performed through a resource in a period other than a period related to a resource in which initial transmission is performed. That is, for example, the transmitting UE may use only a resource within one period when perform transmission related to the transport block. Through this, in the mode 2 operation, the receiving UE can implicitly determine the start/end time of resources used for reception related to a specific transport block. For example, the receiving UE may flush the related buffer without expecting any further retransmission after the end time.

Figure 15:
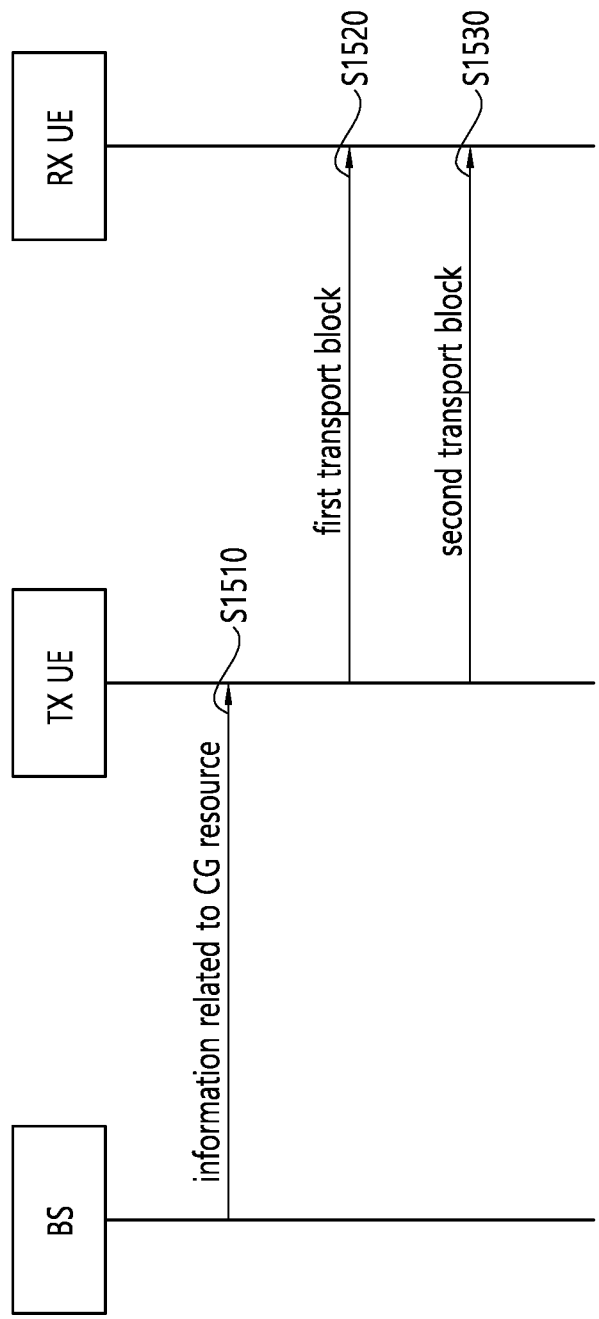
FIG. 15 shows a procedure in which a transmitting UE transmits different transport blocks to a receiving UE, based on an embodiment of the present disclosure.

FIG. 15 shows a procedure in which a transmitting UE transmits different transport blocks to a receiving UE, based on an embodiment of the present disclosure. The embodiment of FIG. 15 may be combined with various embodiments of the present disclosure.

Referring to FIG. 15, in step S1510, the transmitting UE may receive information related to a CG resource from the base station. For example, the information related to the CG resource may include at least one of period information on the CG resource, information on the time domain related to the CG resource, information on the frequency domain related to the CG resource, or an offset related to the CG resource.

In step S1520, the transmitting UE may transmit a first transport block to the receiving UE through resource(s) within a first period. For example, the transmitting UE may transmit the first transport block to the receiving UE through the resource(s) within the first period based on the period information on the CG resource.

In step S1530, the transmitting UE may transmit a second transport block to the receiving UE through resource(s) within a second period. For example, the transmitting UE may transmit the second transport block to the receiving UE through the resource(s) within the second period based on the period information on the CG resource. For example, the resource(s) within the first period and the resource(s) within the second period may not be shared with each other. For example, the second transport block may be a transport block transmitted through a reserved resource after the maximum time gap that can be signaled through a SCI. For example, the transmitting UE may not select a resource within the second period as a resource for retransmitting the first transport block. For example, based on failure of transmission of the first transport block, the transmitting UE may reserve a resource for retransmitting the first transport block. For example, information related to a resource within the second period may not be signaled through a sidelink control information (SCI) related to a resource for retransmitting the first transport block. For example, retransmission for the first transport block may be HARQ feedback-based retransmission. For example, based on the successful transmission of the first transport block by the transmitting UE, the transmitting UE may not select a resource within the first period after the successful transmission of the first transport block as a resource for transmitting the second transport block. For example, the transmitting UE may select a resource for retransmitting the first transport block based on either chain-based resource selection or block-based resource selection.

For example, the transmitting UE may transmit a SCI to the receiving UE through a PSCCH. For example, the SCI may include a pre-configured field. For example, the pre-configured field may include a period related to the first transport block or a time gap related to the first transport block. For example, based on that the SCI is a SCI related to the first resource, the SCI may include at least one of the start location of the frequency domain related to the second resource, the size of the frequency domain of the second resource, the start location of the frequency domain related to the third resource, the size of the frequency domain of the third resource, information on the time gap between the first resource and the second resource, or information on the time gap between the second resource and the third resource. For example, the start location of the frequency domain related to the second resource and the start location of the frequency domain related to the third resource may be indicated by a field of $\log_2(X)$ bit. For example, X may be the total number of subchannels in one slot. Also, for example, based on that the SCI is a SCI related to an odd-numbered resource, the SCI may include information on a resource related to the SCI and two resources after the resource related to the SCI. For example, based on that the SCI is a SCI related to an even-numbered resource, the SCI may include information on a resource related to the SCI, a resource before the resource related to the SCI, and a resource after the resource related to the SCI.

In the above-described embodiment, for convenience of description, it is assumed that a receiving UE receiving the first transport block and a receiving UE receiving the second transport block are the same. Also, for example, a receiving UE receiving the first transport block and a receiving UE receiving the second transport block may be different.

Figure 16:
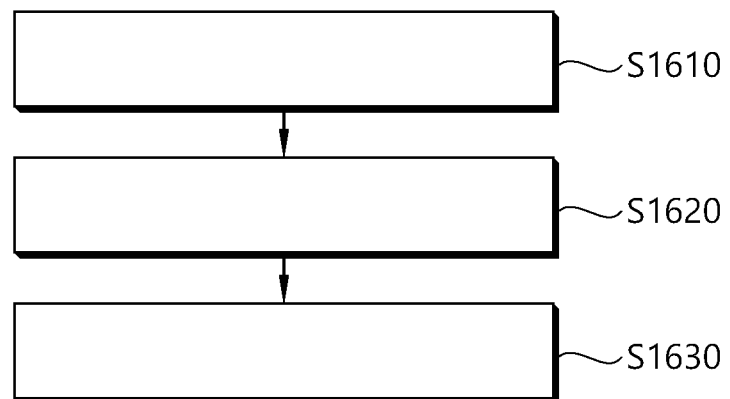
FIG. 16 shows a method for a first device to transmit different transport blocks based on information related to a CG resource, based on an embodiment of the present disclosure.

FIG. 16 shows a method for a first device to transmit different transport blocks based on information related to a CG resource, based on an embodiment of the present disclosure. The embodiment of FIG. 16 may be combined with various embodiments of the present disclosure.

Referring to FIG. 16, in step S1610, the first device 100 may receive information related to a configured grant (CG) resource. For example, the first device 100 may receive the information related to the CG resource from the base station. For example, the first device 100 may receive the information related to the CG resource from the second device 200. For example, the information related to the CG resource may be pre-configured for the first device 100, for example, the information related to the CG resource may include period information on the CG resource.

In step S1620, the first device 100 may transmit a first transport block through a resource within a first period based on the period information on the CG resource. For example, the first device 100 may reserve a resource for retransmitting the first transport block based on failure of the transmission of the first transport block. For example, information related to a resource within the second period may not be signaled through a sidelink control information (SCI) related to the resource for retransmitting the first transport block. For example, retransmission for the first transport block may be HARQ feedback-based retransmission. For example, the first device 100 may select the resource for retransmitting the first transport block based on either chain-based resource selection or block-based resource selection.

In step S1630, the first device 100 may transmit a second transport block through a resource within a second period based on the period information on the CG resource. For example, the resource within the second period may not be selected as the resource for retransmitting the first transport block. For example, a resource within the first period and a resource within the second period may not be shared with each other. For example, based on successful transmission of the first transport block, the first device 100 may not select a sidelink resource within the first period after the successful transmission of the first transport block as a resource for transmitting the second transport block. For example, the second transport block may be transmitted through a reserved resource after the maximum time gap that is allowed to signal through a SCI. For example, a transport block transmitted through the resource reserved after the maximum time gap that is allowed to signal through the SCI related to the first transport block may be the second transport block.

The first device 100 may transmit a SCI to the second device 200 through a physical sidelink control channel (PSCCH). For example, the SCI may include a pre-configured field. For example, the pre-configured field may include a period related to the first transport block or a time gap related to the first transport block. For example, based on that the SCI is a SCI related to the first resource, the SCI may include a start location of a frequency domain related to 2nd resource, a size of the frequency domain of the 2nd resource, a start location of a frequency domain related to 3rd resource, a size of the frequency domain of the 3rd resource, information on a time gap between the 1st resource and the 2nd resource, and information on a time gap between the 2nd resource and the 3rd resource. For example, the start location of the frequency domain related to the 2nd resource and the start location of the frequency domain related to the 3rd resource may be represented by a field of log 2(X) bits. For example, X may be the total number of subchannels on one slot. For example, based on that the SCI is a SCI related to an odd-numbered resource, the SCI may include information on a resource related to the SCI and two resources after the resource related to the SCI. For example, based on that the SCI is a SCI related to an even-numbered resource, the SCI may include information on a resource related to the SCI, a resource before the resource related to the SCI, and a resource after the resource related to the SCI.

The above-described embodiment may be applied to various devices to be described below. For example, the processor 102 of the first device 100 may control the transceiver 106 to receive the information related to the CG resource. In addition, the processor 102 of the first device 100 may control the transceiver 106 to transmit the first transport block through the resource within the first period based on the period information on the CG resource. In addition, the processor 102 of the first device 100 may control the transceiver 106 to transmit the second transport block through the resource within the second period based on the period information on the CG resource.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive information related to a configured grant (CG) resource, wherein the information related to the CG resource including period information on the CG resource; transmit a first transport block through a resource within a first period based on the period information on the CG resource; and transmit a second transport block through a resource within a second period based on the period information on the CG resource. For example, a resource within the second period may not be selected as a resource for retransmitting the first transport block.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive information related to a configured grant (CG) resource, wherein the information related to the CG resource including period information on the CG resource; transmit a first transport block through a resource within a first period based on the period information on the CG resource; and transmit a second transport block through a resource within a second period based on the period information on the CG resource. For example, a resource within the second period may not be selected as a resource for retransmitting the first transport block.

Based on an embodiment of the present disclosure, a non-transitory computer-readable storage medium storing instructions may be provided. For example, the instructions, when executed, may cause a first device to: receive information related to a configured grant (CG) resource, wherein the information related to the CG resource including period information on the CG resource; transmit a first transport block through a resource within a first period based on the period information on the CG resource; and transmit a second transport block through a resource within a second period based on the period information on the CG resource. For example, a resource within the second period may not be selected as a resource for retransmitting the first transport block.

Figure 17:
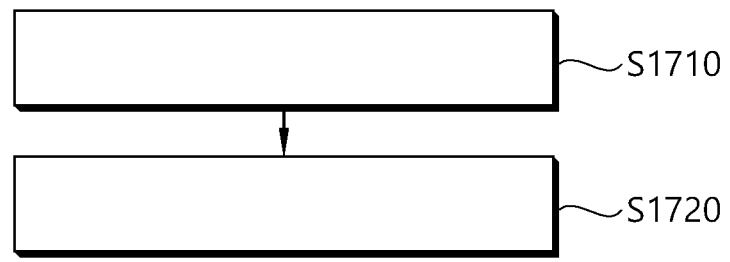
FIG. 17 shows a method for a second device to receive different transport blocks from a first device, based on an embodiment of the present disclosure.

FIG. 17 shows a method for a second device to receive different transport blocks from a first device, based on an embodiment of the present disclosure. The embodiment of FIG. 17 may be combined with various embodiments of the present disclosure.

Referring to FIG. 17, in step S1710, the second device 200 may receive a first transport block from the first device 100 through a resource within a first period based on period information on a CG resource. For example, information related to the CG resource may be received. For example, the information related to the CG resource may include the period information on the CG resource. For example, based on failure of transmission of the first transport block, a resource for retransmitting the first transport block may be reserved. For example, information related to a resource within a second period may not be signaled through a sidelink control information (SCI) related to the resource for retransmitting the first transport block. For example, retransmission for the first transport block may be HARQ feedback-based retransmission. For example, the resource for retransmitting the first transport block may be selected based on either chain-based resource selection or block-based resource selection.

In step S1720, the second device 200 may receive a second transport block from the first device 100 through a resource within the second period based on the period information on the CG resource. For example, the second period resource may not be selected as the resource for retransmitting the first transport block. For example, a resource within the first period and a resource within the second period may not be shared with each other. For example, based on the successful transmission of the first transport block, a sidelink resource within the first period after the successful transmission of the first transport block may not be selected as the resource for transmitting the second transport block. For example, the second transport block may be transmitted through a reserved resource after the maximum time gap that is allowed to signal through a SCI. For example, a transport block transmitted through the resource reserved after the maximum time gap that is allowed to signal through the SCI related to the first transport block may be the second transport block.

For example, the second device 200 may receive a SCI from the first device 100 through a physical sidelink control channel (PSCCH). For example, the SCI may include a pre-configured field. For example, the pre-configured field may include a period related to the first transport block or a time gap related to the first transport block. For example, based on that the SCI is a SCI related to the first resource, the SCI may include a start location of a frequency domain related to 2nd resource, a size of the frequency domain of the 2nd resource, a start location of a frequency domain related to 3rd resource, a size of the frequency domain of the 3rd resource, information on a time gap between the 1st resource and the 2nd resource, and information on a time gap between the 2nd resource and the 3rd resource. For example, the start location of the frequency domain related to the 2nd resource and the start location of the frequency domain related to the 3rd resource may be represented by a field of log 2(X) bits. For example, X may be the total number of subchannels on one slot. For example, based on that the SCI is a SCI related to an odd-numbered resource, the SCI may include information on a resource related to the SCI and two resources after the resource related to the SCI. For example, based on that the SCI is a SCI related to an even-numbered resource, the SCI may include information on a resource related to the SCI, a resource before the resource related to the SCI, and a resource after the resource related to the SCI.

The above-described embodiment may be applied to various devices to be described below. For example, the processor 202 of the second device 200 may control the transceiver 206 to receive the first transport block from the first device 100 through the resource within the first period based on the period information for the CG resource. In addition, the processor 202 of the second device 200 may control the transceiver 206 to receive the second transport block from the first device 100 through the resource within the second period based on the period information on the CG resource.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device, a first transport block through a resource in a first period based on period information on a configured grant (CG) resource; and receive, from the first device, a second transport block through a resource in a second period based on the period information on the CG resource. For example, the information related to the CG resource is received. For example, the information related to the CG resource may include the period information on the CG resource. For example, a resource within the second period may not be selected as a resource for retransmitting the first transport block.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
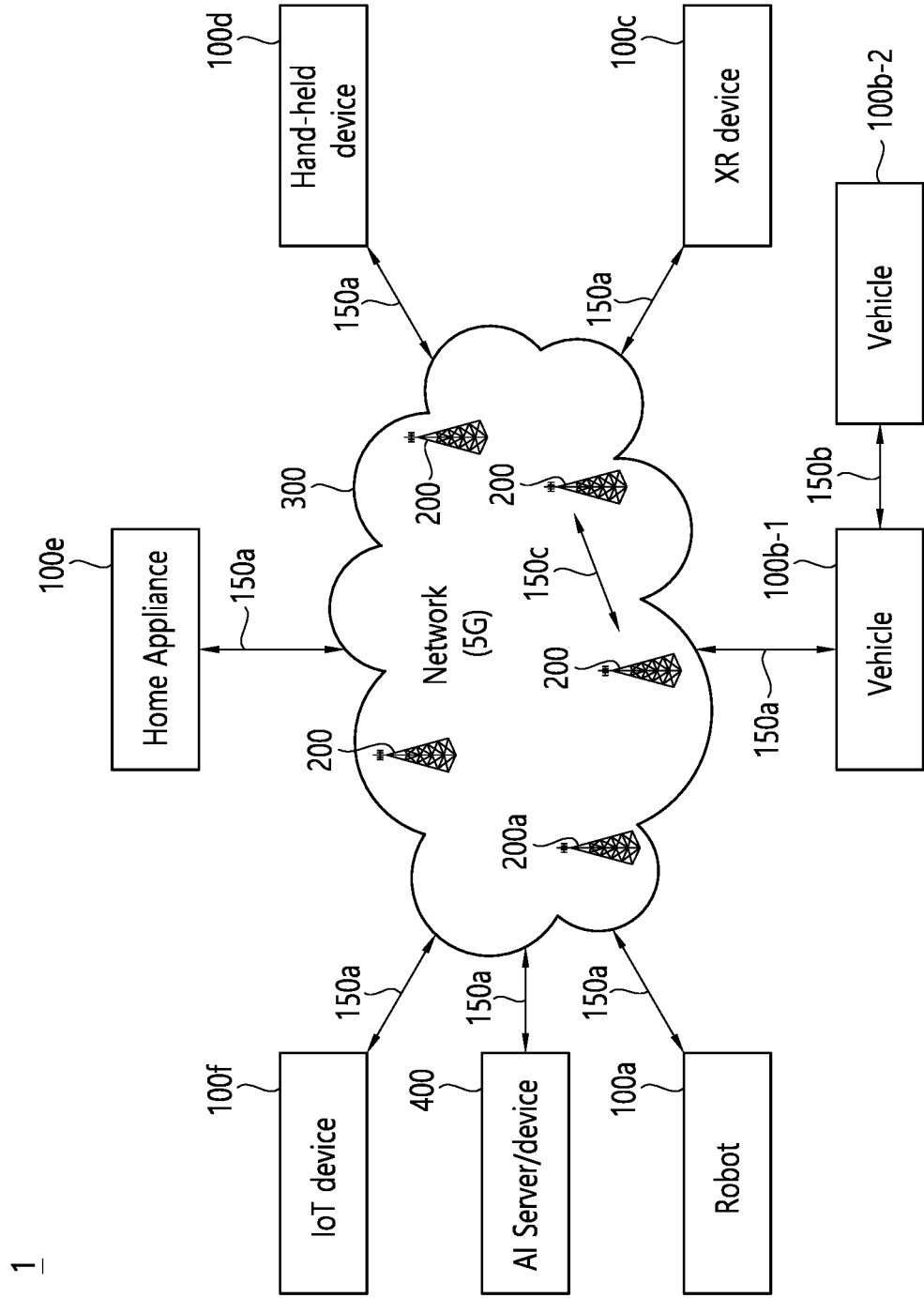
FIG. 18 shows a communication system 1, based on an embodiment of the present disclosure.

FIG. 18 shows a communication system 1, based on an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
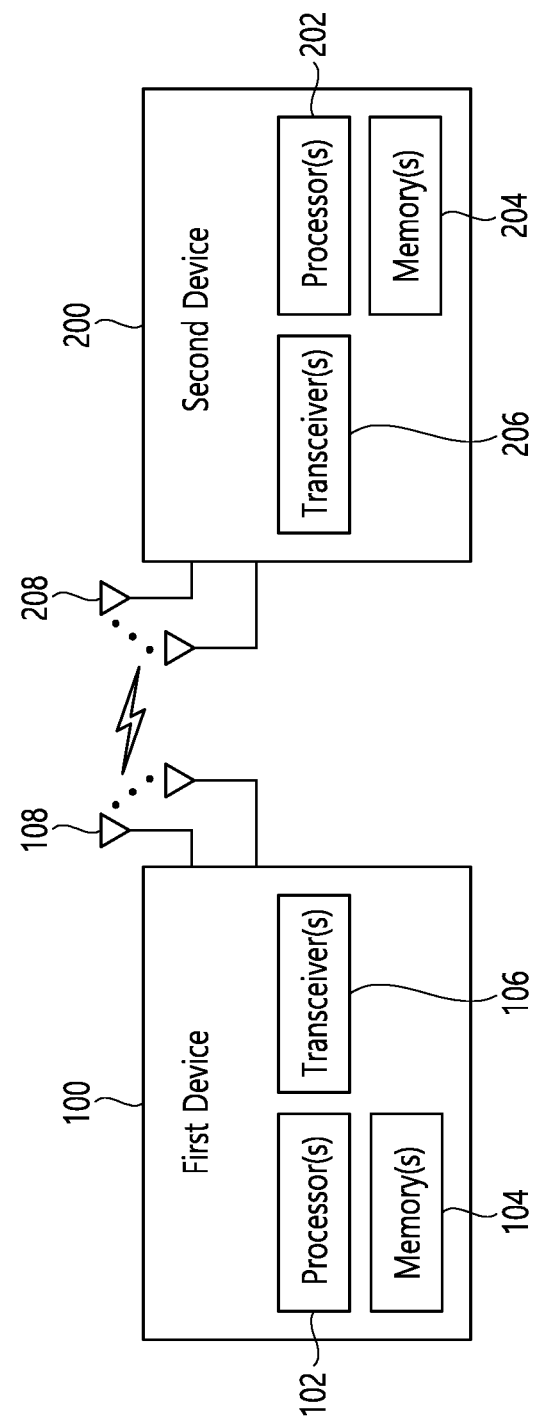
FIG. 19 shows wireless devices, based on an embodiment of the present disclosure.

FIG. 19 shows wireless devices, based on an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
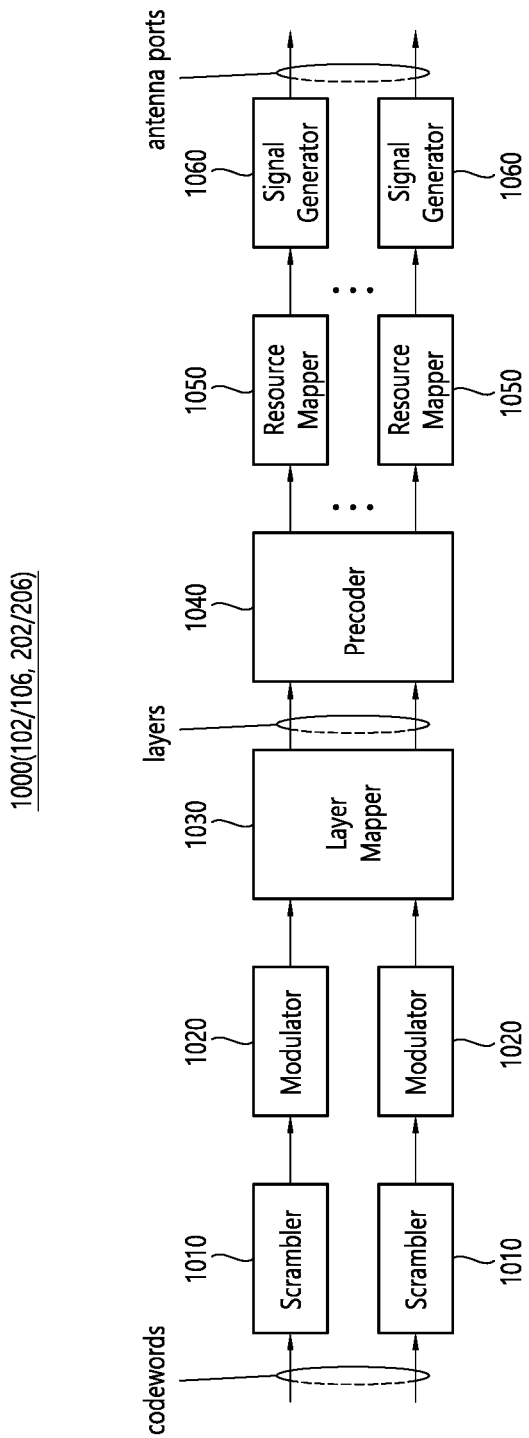
FIG. 20 shows a signal process circuit for a transmission signal, based on an embodiment of the present disclosure.

FIG. 20 shows a signal process circuit for a transmission signal, based on an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
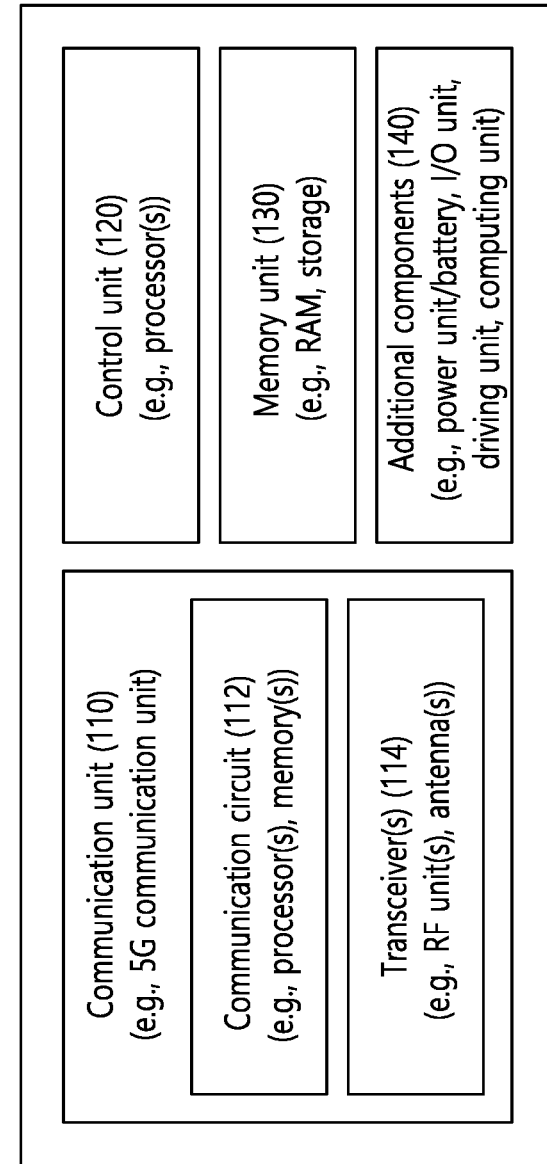
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
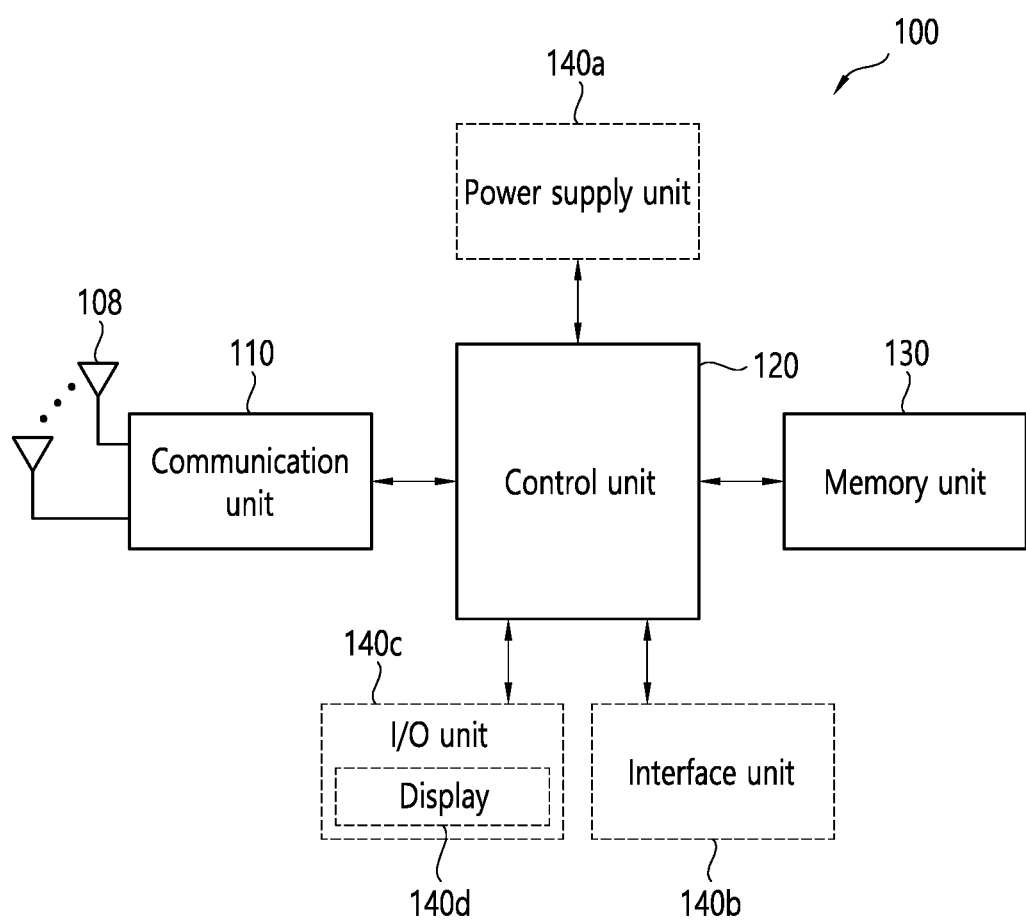
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/ signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
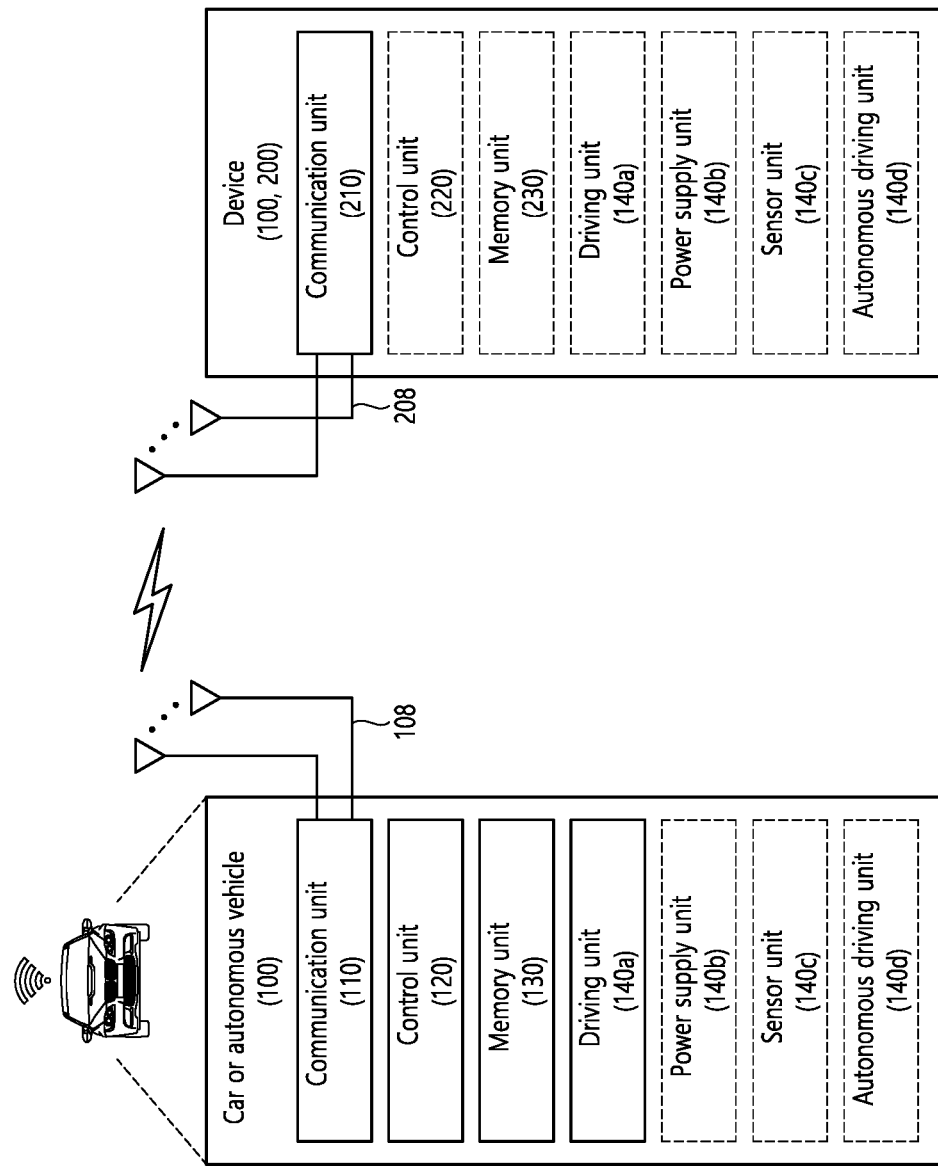
FIG. 23 shows a vehicle or an autonomous vehicle, based on an embodiment of the present disclosure.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
   obtaining information related to a start of a sensing window;
   triggering resource selection in a slot;
   determining a selection window based on the slot and a remaining packet delay budget (PDB);
   determining the sensing window based on the information related to the start of the sensing window and a processing time;
   determining a first resource within the selection window and a first resource reservation period, based on monitoring slots within the sensing window;
   determining a second resource within a second resource reservation period, based on the first resource and a resource reservation interval; and
   transmitting, to a second device, a first medium access control (MAC) protocol data unit (PDU) based on the first resource within the first resource reservation period,
   wherein the first device is not allowed to transmit the first MAC PDU within the second resource reservation period.

2. The method of claim 1, further comprising:
   obtaining at least one resource reservation period configured for a resource pool.

3. The method of claim 2, wherein the resource reservation interval is selected from among the at least one resource reservation period configured for the resource pool.

4. The method of claim 3, wherein the resource reservation interval selected by the first device is a value larger than the remaining PDB.

5. The method of claim 4, further comprising:
   transmitting, to the second device through a physical sidelink control channel (PSCCH), a sidelink control information (SCI) including information related to the resource reservation interval.

6. The method of claim 1, further comprising:
   transmitting a second MAC PDU based on the second resource within the second resource reservation period.

7. The method of claim 6, wherein the first device is not allowed to transmit the second MAC PDU within the first resource reservation period.

8. The method of claim 1, wherein the second resource reservation period is a period subsequent to the first resource reservation period.

9. The method of claim 1, wherein the first device is not allowed to select a resource for transmission of the first MAC PDU within the second resource reservation period.

10. The method of claim 1, wherein resources for transmission of a same MAC PDU are not shared between different resource reservation periods.

11. The method of claim 1, wherein an end the selection window is less than or equal to the remaining PDB.

12. A first device configured to perform wireless communication, the first device comprising:
 at least one transceiver;
 at least one processor; and
 at least one memory connected to the at least one processor and storing instructions that, based on being executed, cause the first device to perform operations comprising:
 obtaining information related to a start of a sensing window;
 triggering resource selection in a slot;
 determining a selection window based on the slot and a remaining packet delay budget (PDB);
 determining the sensing window based on the information related to the start of the sensing window and a processing time;
 determining a first resource within the selection window and a first resource reservation period, based on monitoring slots within the sensing window;
 determining a second resource within a second resource reservation period, based on the first resource and a resource reservation interval; and
 transmitting, to a second device, a first medium access control (MAC) protocol data unit (PDU) based on the first resource within the first resource reservation period,
 wherein the first device is not allowed to transmit the first MAC PDU within the second resource reservation period.

13. The first device of claim 12, wherein the resource reservation interval is selected from among at least one resource reservation period configured for a resource pool.

14. The first device of claim 13, wherein the resource reservation interval selected by the first device is a value larger than the remaining PDB.

15. The first device of claim 12, wherein the operations further comprise transmitting a second MAC PDU based on the second resource within the second resource reservation period, and
 wherein the first device is not allowed to transmit the second MAC PDU within the first resource reservation period.

16. The first device of claim 12, wherein the second resource reservation period is a period subsequent to the first resource reservation period.

17. An apparatus configured to control a first user equipment (UE), the apparatus comprising:
 at least one processor; and
 at least one memory connected to the at least one processor and storing instructions that, based on being executed, cause the first UE to perform operations comprising:
 obtaining information related to a start of a sensing window;
 triggering resource selection in a slot;
 determining a selection window based on the slot and a remaining packet delay budget (PDB);
 determining the sensing window based on the information related to the start of the sensing window and a processing time;
 determining a first resource within the selection window and a first resource reservation period, based on monitoring slots within the sensing window;
 determining a second resource within a second resource reservation period, based on the first resource and a resource reservation interval; and
 transmitting, to a second UE, a first medium access control (MAC) protocol data unit (PDU) based on the first resource within the first resource reservation period,
 wherein the first UE is not allowed to transmit the first MAC PDU within the second resource reservation period.

18. The apparatus of claim 17, wherein the resource reservation interval is selected from among at least one resource reservation period configured for a resource pool.

19. The apparatus of claim 18, wherein the resource reservation interval selected by the first UE is a value larger than the remaining PDB.

20. The apparatus of claim 17, wherein the operations further comprise transmitting a second MAC PDU based on the second resource within the second resource reservation period, and
 wherein the first UE is not allowed to transmit the second MAC PDU within the first resource reservation period.

* * * * *